United States Patent [19]

Bier

[11] Patent Number: 5,408,250

[45] Date of Patent: Apr. 18, 1995

[54] PORTABLE COMPUTER FOR SHORT-RANGE GRAPHICAL MULTIPARTY COMMUNICATION

[75] Inventor: Eric A. Bier, Los Altos, Calif.

[73] Assignee: Xerox Corporation, Stamford, Conn.

[21] Appl. No.: 113,881

[22] Filed: Aug. 30, 1993

Related U.S. Application Data

[63] Continuation of Ser. No. 703,221, May 20, 1991, abandoned.

[51] Int. Cl.⁶ .............................................. G09G 5/00
[52] U.S. Cl. ..................................................... 345/169
[58] Field of Search ............... 340/706, 707, 709, 712, 340/716, 717; 178/18, 19; 434/322, 323, 336, 337, 339, 350; 370/95.1; 345/156, 169, 179; 455/89, 90, 74; 395/200 MS File

[56] References Cited

U.S. PATENT DOCUMENTS

| | | | |
|---|---|---|---|
| 4,310,317 | 1/1982 | Nomura et al. | 434/350 |
| 4,394,649 | 7/1983 | Suchoff et al. | 340/706 |
| 4,545,023 | 10/1985 | Mizzi | 340/712 |
| 4,609,776 | 9/1986 | Murakami et al. | 178/18 |
| 4,644,352 | 2/1987 | Fujii | 340/712 |
| 4,713,808 | 12/1987 | Gaskill . | |
| 4,794,634 | 12/1988 | Torihata et al. | 178/18 |
| 5,027,198 | 6/1991 | Yoshioka | 178/18 |
| 5,051,985 | 9/1991 | Cidon et al. | 370/95.1 X |
| 5,150,954 | 9/1992 | Hoff . | |
| 5,159,713 | 10/1992 | Gaskill . | |
| 5,168,271 | 12/1992 | Hoff . | |
| 5,239,466 | 8/1993 | Morgan et al. | 395/200 |

FOREIGN PATENT DOCUMENTS

| | | |
|---|---|---|
| 0321084A2 | 6/1989 | European Pat. Off. . |
| 2165679 | 4/1986 | United Kingdom . |
| 2206718 | 1/1989 | United Kingdom . |
| 88/09091 | 11/1988 | WIPO . |
| 8905023 | 6/1989 | WIPO ................................ 340/706 |
| 90/16030 | 12/1990 | WIPO . |

OTHER PUBLICATIONS

Goldbacher, A. "EDV-Chinesisch kommt aus der Mode", *Magazine Handhelt-Computer*, May, 1991.
"The Architecture of Vedeotex Systems" by Jan Gecsei, 1983, pp. 174–177.

*Primary Examiner*—Jeffery Brier
*Attorney, Agent, or Firm*—Townsend and Townsend Khourie and Crew

[57] ABSTRACT

A portable device for silent graphical communication. The device has a display screen on which a user may scribble notes and information using a stylus. These notes, which are then broadcast by the device, are received by other similar devices and displayed on the screens of the other devices. User of the other devices can respond to the received information by scribbling their own notes. The ensuing conversations may be password protected.

35 Claims, 20 Drawing Sheets

PORTABLE COMPUTER FOR SHORT-RANGE GRAPHICAL MULTIPARTY COMMUNICATION

This is a Continuation of application Ser. No. 07/703,221, filed May 20, 1991, now abandoned.

BACKGROUND OF THE INVENTION

Many situations exist in which people are near to each other (say within a few hundred yards) and wish to communicate silently and graphically, across the distance that separates them. For example, if two groups of people, each in separate cars, are driving up to the mountains together, one group may wish to draw a map for the other group or suggest a place to stop for lunch. In a classroom or meeting room, individuals may wish to communicate with each other, even when separated by a large table or by several chairs. In amusement parks and shopping malls, parents and children may desire the ability to separate, yet retain the ability to communicate and agree on a later meeting place. In parking lots, airports, auditoriums, or hiking trails, where people often get separated from each other, people would like be to be able to get in touch.

Some techniques for handling these problems exist. When several cars go on a trip together, they can communicate using Citizen's Band (CB) radios. People in classrooms and meetings can pass notes to each other by passing folded pieces of paper from hand to hand. People in large open areas can use walkie-talkies. Motorists in urban centers can also communicate using cellular phones from car to car.

The aforementioned technologies, however, do not permit silent, graphical communication. The noise generated by verbal communication using a walkie-talkie or cellular telephone is inappropriate in a classroom or meeting situation. While a fax machine may provide silent, graphical communication for some applications, this device requires a supply of paper and is not portable.

SUMMARY OF THE INVENTION

The present invention allows persons to engage in silent, graphical communication using a small portable device. The present invention thus permits users to communicate in meetings and in other locations where voice communication is impractical or inappropriate.

According to one feature of the present invention, a device is equipped with a flat panel display, a stylus, and a short-range radio transceiver. A person holding the device can communicate with another person having a similar device by writing a message on the liquid crystal display and transmitting the message. People can thus communicate silently across a distance.

According to another feature of the invention, several people can participate in several conversations simultaneously.

According to yet another feature of the invention, the devices used for silent, graphical communications are able to work out a conversation order for themselves without the need for a central control system. Each device stores a list of devices it has heard transmitting. At the end of each transmission, the device broadcasts its own identification number and the identification number of the device which should broadcast next. The order of broadcast is deduced from the sequence in which these transmissions are heard.

According to yet another feature of the present invention, the devices can work out an initial order of communications by transmitting an individual broadcast identification number followed by an end of transmission signal which includes this identification number. Other devices hear this transmission and add the broadcast identification number to their list of devices. A device which has received this broadcast and wishes to communicate with the first device will broadcast its identification number followed by an end of transmission signal that includes the first device number. The devices have thus worked out a communication sequence.

DESCRIPTION OF A PREFERRED EMBODIMENT

Figure 1:
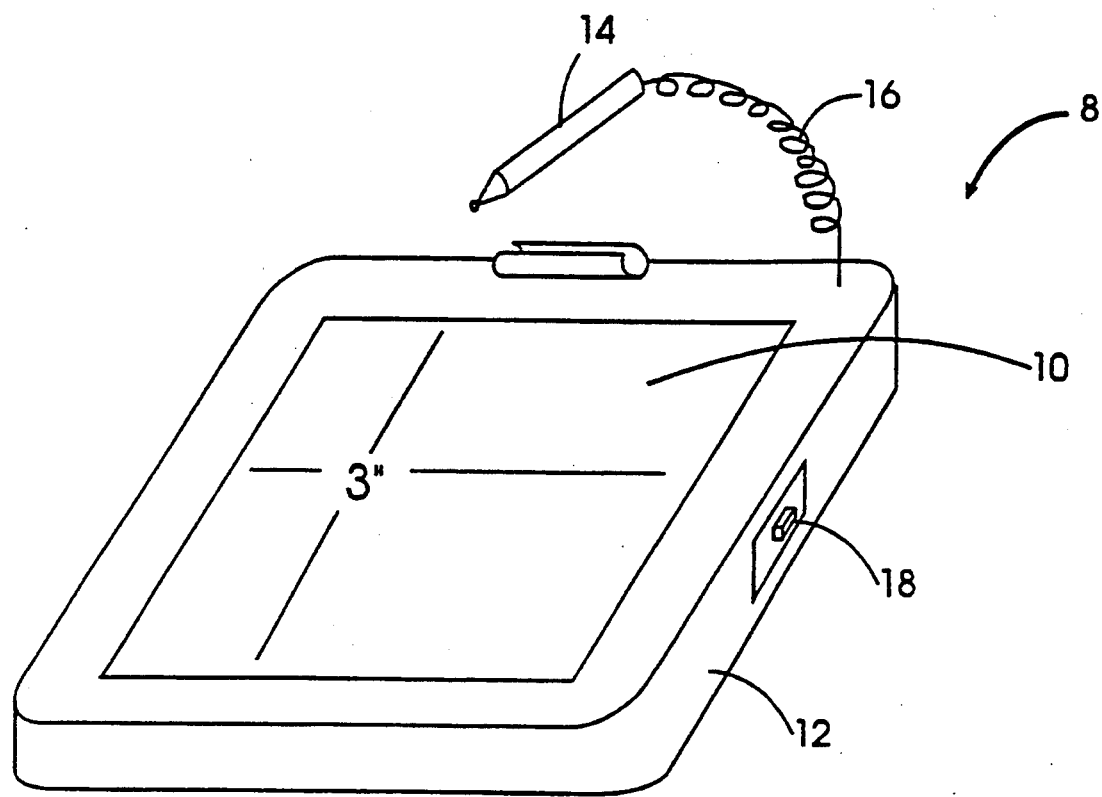
FIG. 1 is an isometric diagram of an embodiment of the present invention.
Figure 2:
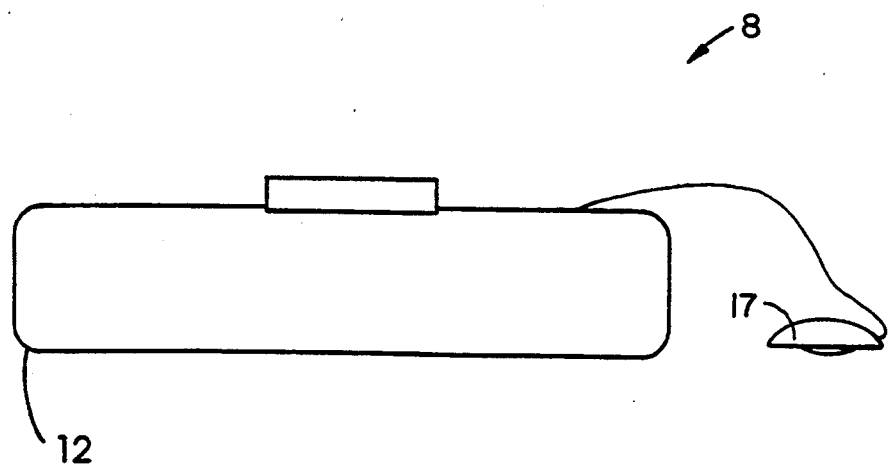
FIG. 2 is a side view of an embodiment of the present invention.

FIG. 1 is an isometric drawing of a communication device, or pad, 8 according to an embodiment of the present invention. FIG. 2 shows a side view of pad 8 according to an embodiment of the present invention. Pad 8 contains a liquid crystal display 10, which is housed in a housing 12. Liquid crystal display 10 may be an off-the-shelf black and white 3 inch×3 inch liquid crystal display. Housing 12 also contains other electronic components, such as a power supply, transceiver and antenna needed to operate device 8. In FIG. 1, an electronic stylus 14 connects to housing 12 via a cable 16. FIG. 2 shows an optional track ball 17 which may also be used as an input device in lieu of, or in addition to, stylus 14 depicted in FIG. 1. A sliding on/off switch located on housing 12 activates device 8.

Figure 3:
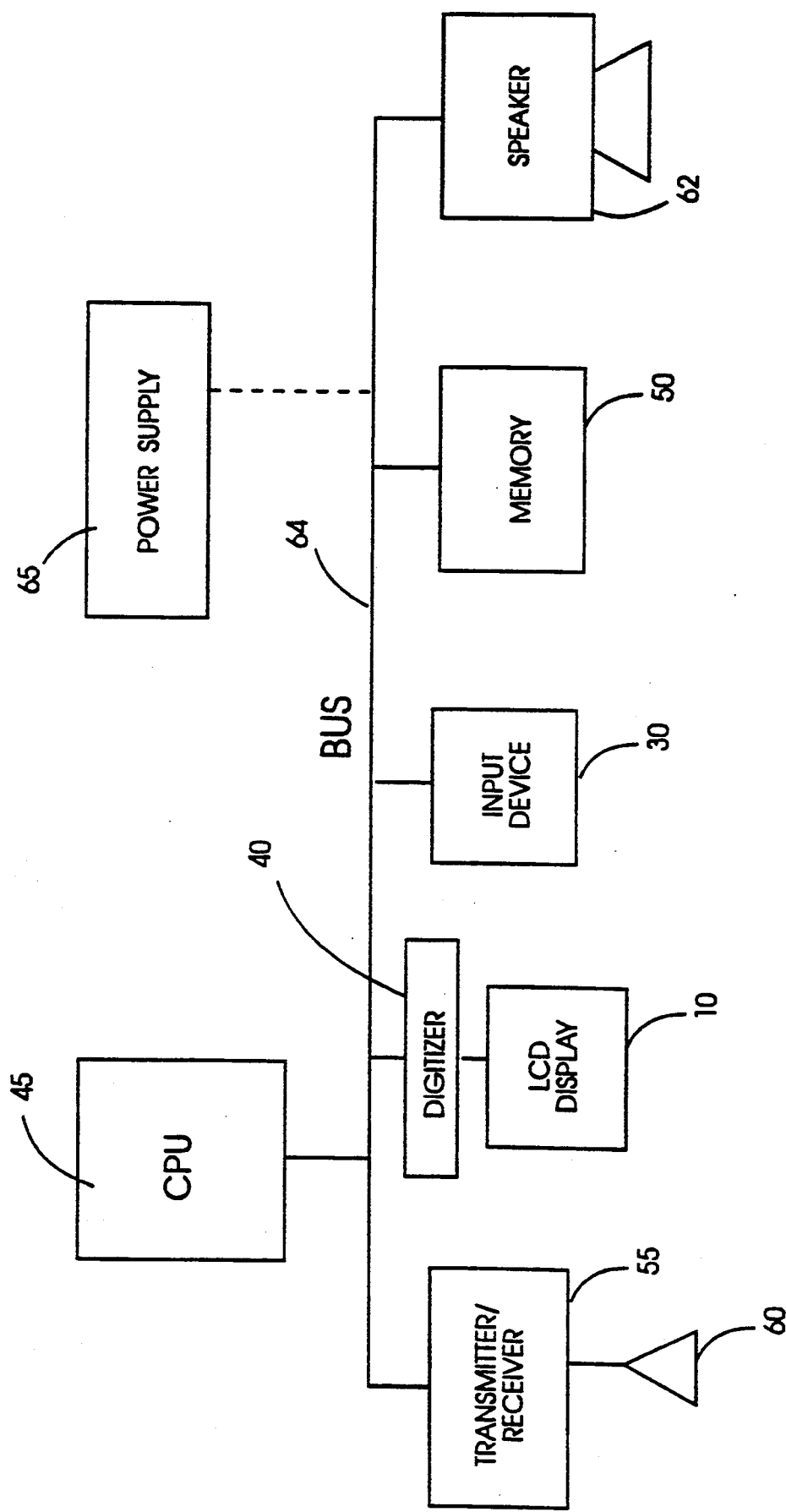
FIG. 3 is a block diagram of an embodiment of the present invention.

FIG. 3 contains a block diagram of pad 8 system elements. System elements include an input device 30 which in a preferred embodiment comprises electronic stylus 14. Input device 30 may also consist of a track ball, 17 or optionally a touch sensitive screen may be used. Input device 30 is used to input data to pad 8 by writing on liquid crystal display 10. Liquid crystal display 10 displays to the user the data entered with input device 30 as well as information received from other pads 8. Alternatively, liquid crystal display 10 may consist of a conventional video screen.

Information written onto display 10 is digitized by digitizer 40. Digitizer 40 stores and plots display information as a series of points and corresponding coordinates under control of a central processing unit 45. Central processing unit 45 governs operations of pad 8 and coordinates the transmission and receipt of communication data. CPU 45 also keeps track of those conversations received by pad 8 in which the user is participating. Commands may also be input by selecting from a menu displayed on display 10 or by direct entry using a virtual keyboard. Operating instructions for central processing unit 45 are stored in memory 50. Memory 50 also stores user-entered commands and data as well as current conversation screens.

Data processed by CPU 45 and digitizer 40 is transmitted for display on other pads 8 by transceiver 55 over antenna 60. Similarly, transceiver 55 receives at antenna 60 communication data which has been broadcast from other pads 8. Received data is processed by CPU 45 and digitizer 40 for display on display 10. Transceiver 55 may be constructed so as to transmit on public radio frequencies allocated for spread-spectrum communication. Such a transceiver would be suitable for longer range communications. Alternatively, transceiver 55 could employ an infrared transmission scheme similar to that used in remote control of household appliances.

Pad 8 may optionally include a speaker 62 which alerts the user to incoming messages, updated conversation screens and/or error signals. Data and address buses 64 permit communication between system elements.

A power supply 65 supplies the power necessary to run pad 8 electronic components. In a preferred embodiment of the present invention power supply 65 may comprise batteries. However, a solar cell, or other transportable power source may be used. In addition, pad 8 may also be connected to an AC power source via an AC to DC converter and appropriate connector (not shown) for use in conference room environments.

Operational Overview

To communicate with others, the user simply writes on the pad using electronic stylus 14. This input to screen 10 is digitized by digitizer 40. The digitized message is processed by CPU 45 for transmission by transceiver 55 as a graphical data set. The graphical data set is comprised of the stylus coordinates which are reconstructed into a bit map by the receiving pad. Optionally, the entire bit map may be transmitted if the broadcast medium has sufficient bandwidth or if a pad is merely rebroadcasting information to update another pad.

When transmitting data, cooperating pads 8 use time slicing to share the available bandwidth. Each pad 8 has several time slots each second in which to transmit data. The number of time slots allocated to each of the pads and the duration of these time slots limit the total number of pads 8 which can operate in a given area. For example, data sent in a single time slot is a packet. If each packet requires 4 milliseconds to send and each pad is allowed to send 20 packets per second, each pad transmits data for 80 milliseconds each second. This example time slicing scheme limits the total number of pads in a given area to twelve.

When a pad 8 is turned on, the pad must find a time slot in which to broadcast. The pad listens for a short interval to determine which slots are in use. During its time slot, a pad must broadcast some data to preserve its place. For example, if the user is actively drawing with the stylus, the pad should describe the new coordinates or the pad can ask for information about existing conversations. If no slots are available, pad 8 continues to listen and cannot participate in a conversation until a slot does become available.

Optionally, the pad transmission protocol can systematically reduce the number of time slots allocated to each pad when a new pad enters the conversation. In this protocol, it is unlikely that a time slot would be unavailable and pad 8 can participate in the existing conversations. However, the collective performance of the pads steadily decays as more pads actively broadcast information and users may notice delays in the transmission and receipt of conversation data.

Each pad 8 can listen to all packets. The packets are sorted in software by CPU 45 according to conversation number. Each conversation has a unique identifier, or conversation number that is chosen at random when a new conversation is started. The conversation number is broadcast, at periodic intervals, by any pad 8 which is updating the state of that conversation. Pads 8 are therefore able to detect which conversation numbers are currently in use and which are not. This information can be displayed on screen 10 of each pad 8. By choosing an unused conversation number, the user can start a new conversation. The user can enter an existing conversation by selecting that conversation number.

When a pad 8 enters the middle of a conversation, the screen is updated to reflect the bit map that the conversation has accumulated so far. On the theory that the most recent parts of the conversation are the most interesting, in one embodiment of the invention, each pad routinely broadcasts the last few hundred draw and erase commands, in reverse order. This operation may be done during periods when the stylus is not moving.

If the existing conversation is password protected, pads can store undecoded draw and erase commands until the password is entered. Upon entry of a password, the old commands can be decoded and acted on all at once to bring pads up to date.

Pads can also participate in multiple conversations simultaneously using several bit maps. Each conversation has its own bit map. Only one bit map is displayed on the screen at a time. Bit maps from other conversations are kept up to date by acting on the commands from their conversations. The user can switch from one conversation to another by deselecting the current conversation and selecting another conversation.

Detailed Description of Device Operation

Pads 8 use a common data and channel sharing command protocol as well as a common data encoding protocol when intercommunicating. The several basic types of data transmitted between pads 8 are summarized in Table 1. The commands transmitted between pads 8 are summarized in Table 2.

Data may be sent as a stream of bits, in which no bit is differentiated from any other. Data reliability is improved, however, by sending the data in a set of fixed-size words with a synchronization signal between each one. For example, in a 12 bit word, to distinguish pad numbers, conversation numbers, coordinates, and commands, the first 2 bits of each word can be allocated as a tag describing the type of data. The following convention may be used: 00 represents pad number; 01 a conversation number; 10 a word of relative coordinates; and 11 represents all other commands. When both x and y coordinates are provided, x coordinates may be designated first.

Up to ten bits are used to encode commands. A command and its data can fit in a single word. For example, if all words beginning with 1100001 are interpreted as the "page number" command, then the last 5 bits can encode the page number itself.

Using the above conventions, each of the several types of command and data information can be encoded as follows:

| | |
|---|---|
| Pad Number: | [00 00000<1st 5 bits>] [00<10 more bits>][00<last 10 bits>] |
| Conversation Number: | [01<10 bit conversation number>] |
| Relative X-Y Coordinates: | [10<x sign bit> <y sign bit> <2 bits x> <2 bits y> <2 bits x> <2 bits y>] |
| Draw Mode: | [11 00000 00000] |
| Erase Mode: | [11 00000 00001] |
| Request for Conversation List: | [11 00000 00010] |
| Page Number: | [11 00001<5 bit page number>] |
| ErasePage Command: | [11 00010<5 bit number of page to erase>] |
| Request for Info: | [11 00011<5 bit page number>] |
| Brush Size: | [11 00100<5 bit brush size>] |
| Over: | [11 00101<1st 5 bit pad number>] [00<10 more bits>] [00<last 10 bits>] |
| OverAndOut: | [11 00111<1st 5 bits pad number>] [00<10 more bits>] [00<last 10 bits>] |
| Review: | [11 01000<5 bit page number>] |
| EndReview: | [11 01001<5 bit page number>] |
| Absolute X-Y Coordinates: | [11 1<9 bits of x or y>] |

Each pad has an array, CN, of conversation numbers, an array, PN of page numbers, an array DM of drawing modes (draw or erase), an array BS of brush sizes, and arrays X and Y of pen coordinates. The arrays contain enough elements to handle the maximum number of pads that could be in a room at once, and are initialized to an initial value at power up.

Figures 1, 4:
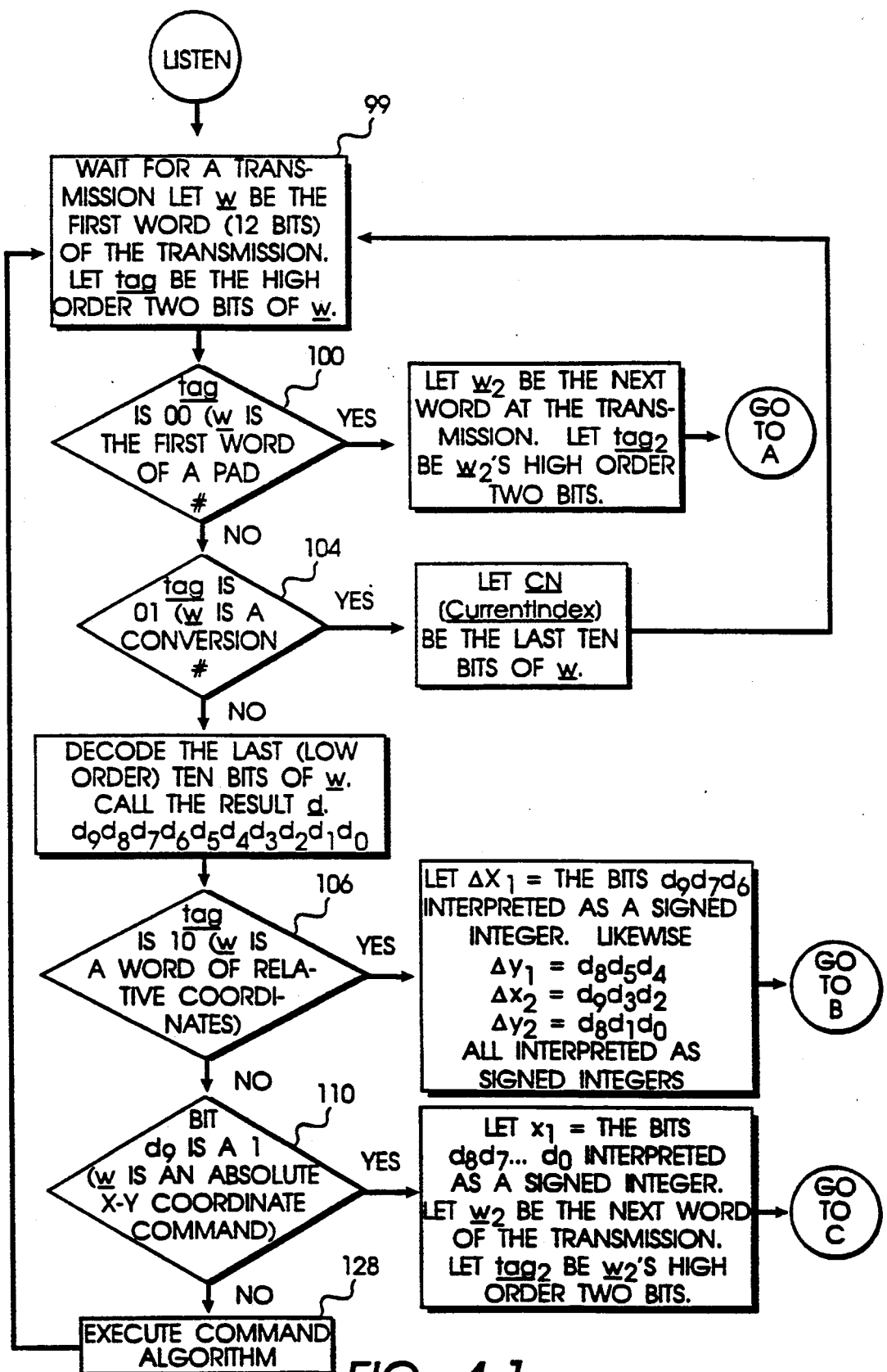
FIG. 4 is a flow chart of a listening algorithm according to an embodiment of the present invention.
Figures 2, 4:
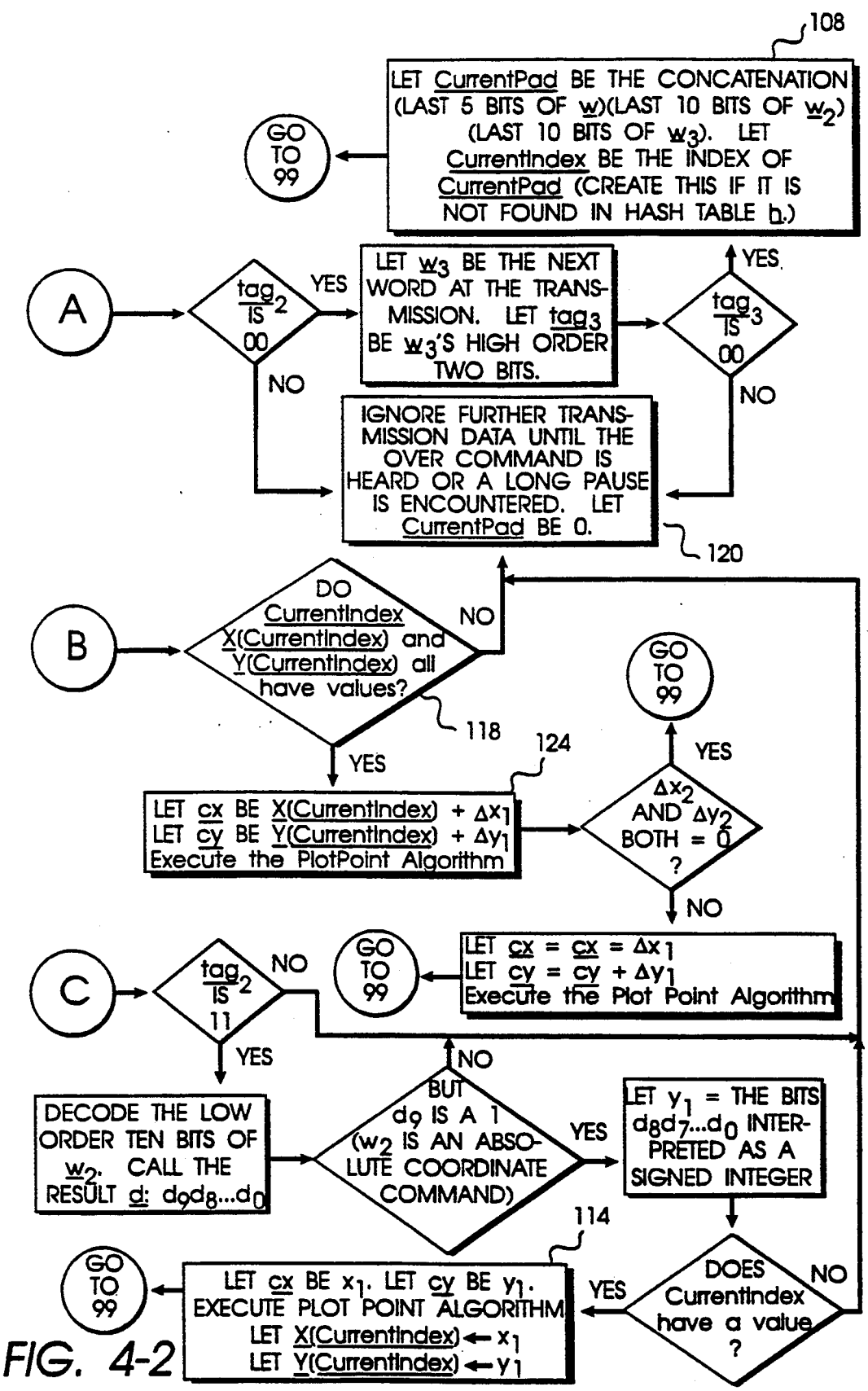

When a pad is not broadcasting a packet of data, the pad is listening to the broadcasts of other pads. As a pad listens, it performs the operations shown in the listening algorithm flow chart of FIG. 4.

When the listening pad receives the first word in the packet, the tag bits are checked in steps 100–106 to determine what type of data is being received. Each packet begins with the pad number of the broadcasting pad. The listening pad stores the number in a variable called currentPad. See step 108. If the listening pad has not heard from the broadcasting pad before, it adds the broadcasting pad to its list, padList, of known pads. The listening pad assigns the broadcasting pad an index $I_B$, storing $I_B$ in a hash table H using the broadcasting pad's pad number as a key. If the broadcasting pad has been heard before, the listening pad looks up the broadcasting pad's number in H to find the index $I_B$. In both cases, the listening pad stores the index $I_B$ in currentIndex. This index will be used to access entries in the arrays CN, PN, DN, BS, X, and Y to store and retrieve information about the transmitting pad. When the listening pad receives a conversation number in step 102, the pad also stores it in CN[currentIndex].

When the listening pad receives a pair of absolute coordinates (step 110), the pad stores them in X[currentIndex] and Y[currentIndex]. Then the listening pad tries to draw a new dot on the screen. If arrays CN, PN, BS, and DM all have values for the currentIndex, then the listening pad finds the bitmap associated with page PN[currentIndex] of conversation CN[currentIndex] and draws (or erases depending on DM[currentIndex]) a dot of diameter BS[currentIndex] at coordinates (X[currentIndex], Y[currentIndex]). See step 114.

When the listening pad receives a non-zero pair of relative coordinates, $(x_r, Y_z)$, the listening pad looks to see in step 118 if X[currentIndex] and Y[currentIndex] are defined. If not, the listening pad ignores the relative coordinates. See step 120. If X[currentIndex] and Y[currentIndex] are defined, the listening pad updates X and Y in step 124 as:

X[currentIndex]→[currentIndex]+$x_r$(*−1 if sign bit for x is 1)

Y[currentIndex]→[currentIndex]+$Y_r$(*−1 is sign bit for y is 1)

Figure 5:
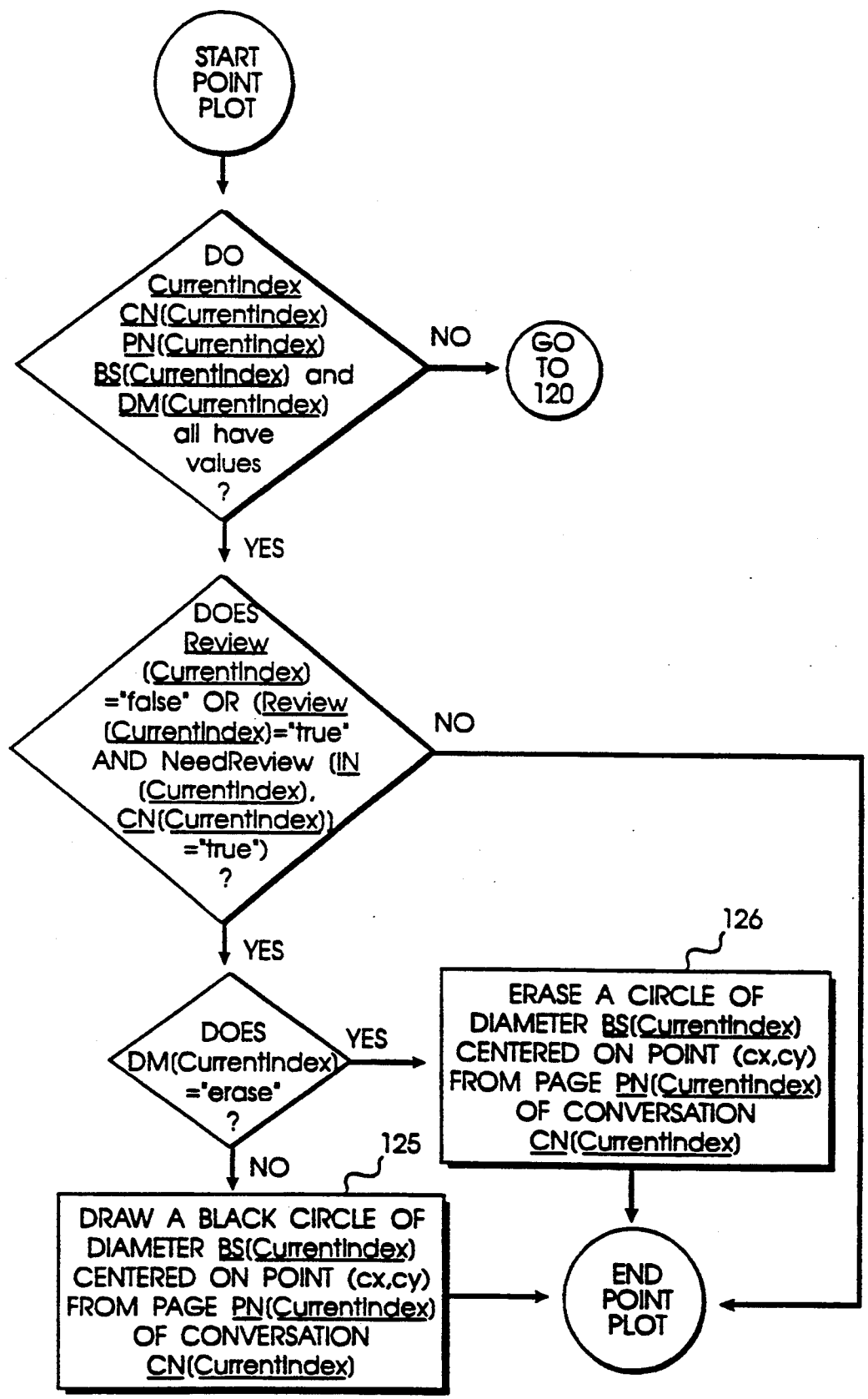
FIG. 5 is a flow chart of a point plotting algorithm according to an embodiment of the present invention.

After this update, the listening pad draws a new dot on the screen. If page PN[currentIndex] of conversation CN[currentIndex] is currently displayed on the listening pad, then the new dot is immediately visible to the user. Otherwise, the new dot is not be visible until the user requests display of that page at a later time. Points are plotted by executing steps 125 and 126 according to the point plot algorithm diagrammed in FIG. 5.

Figures 1, 6:
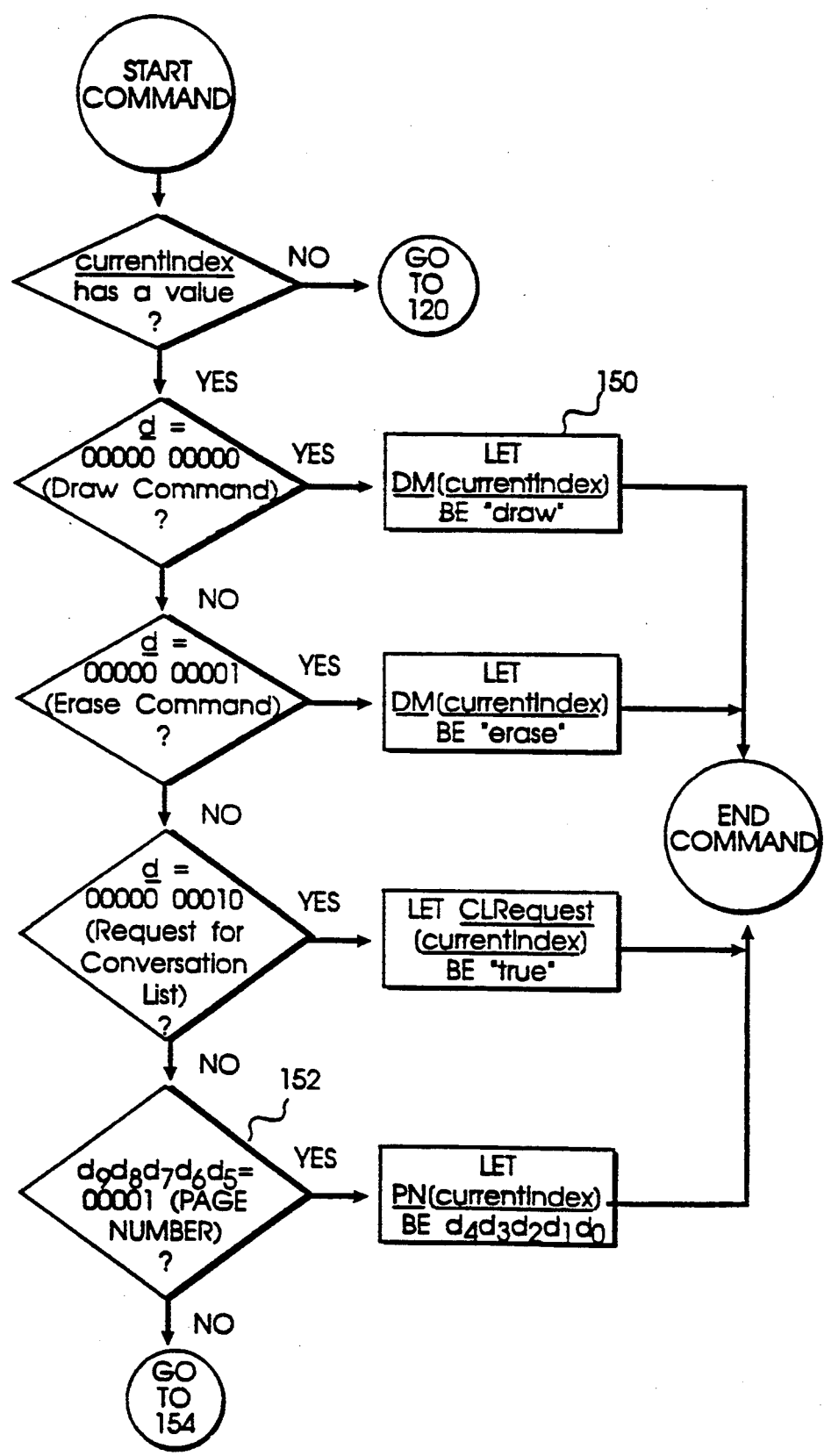
FIG. 6 is a flow chart of a command execution algorithm according to an embodiment of the present invention.
Figures 2, 6:
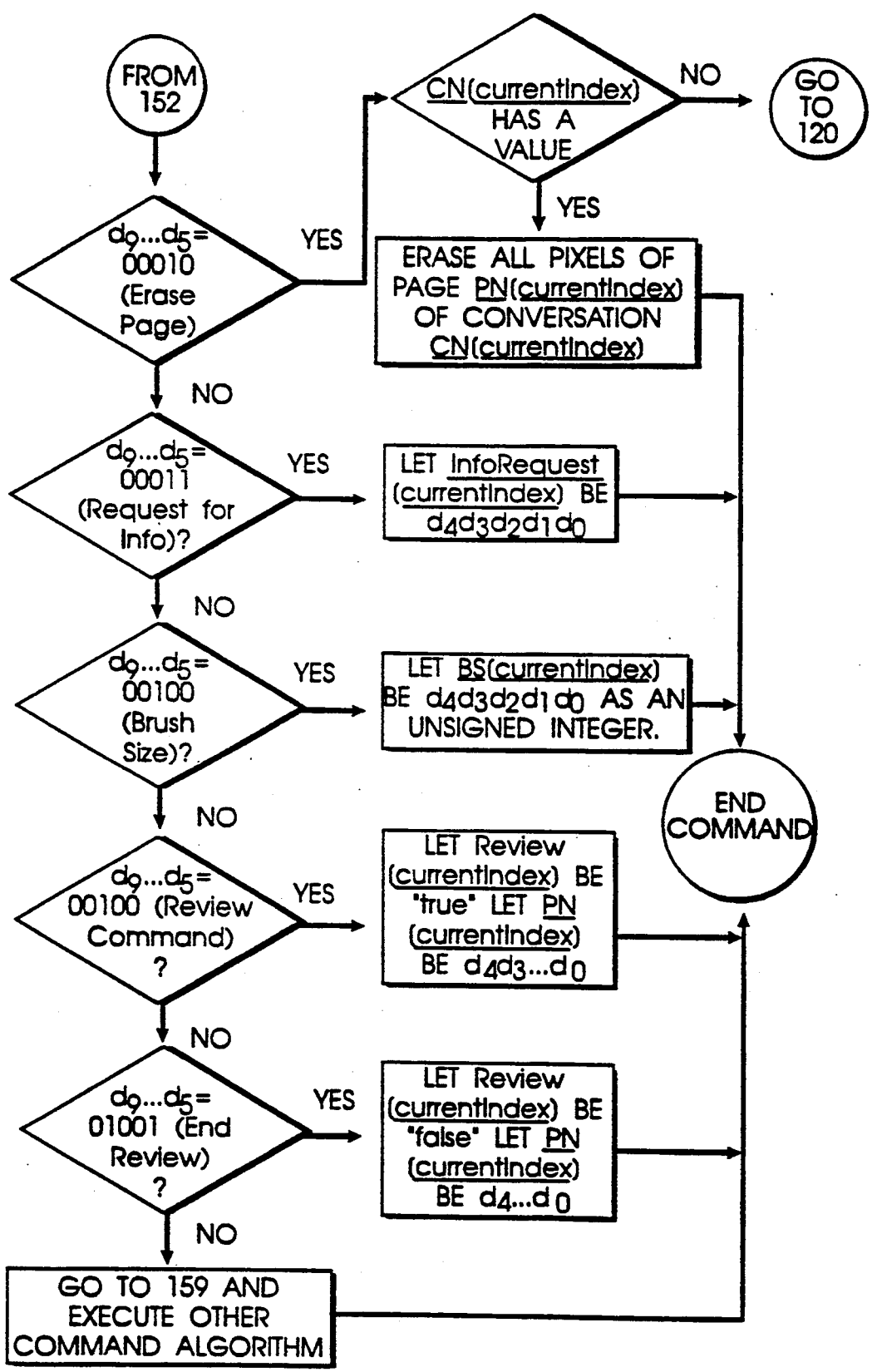
Figures 3, 6:
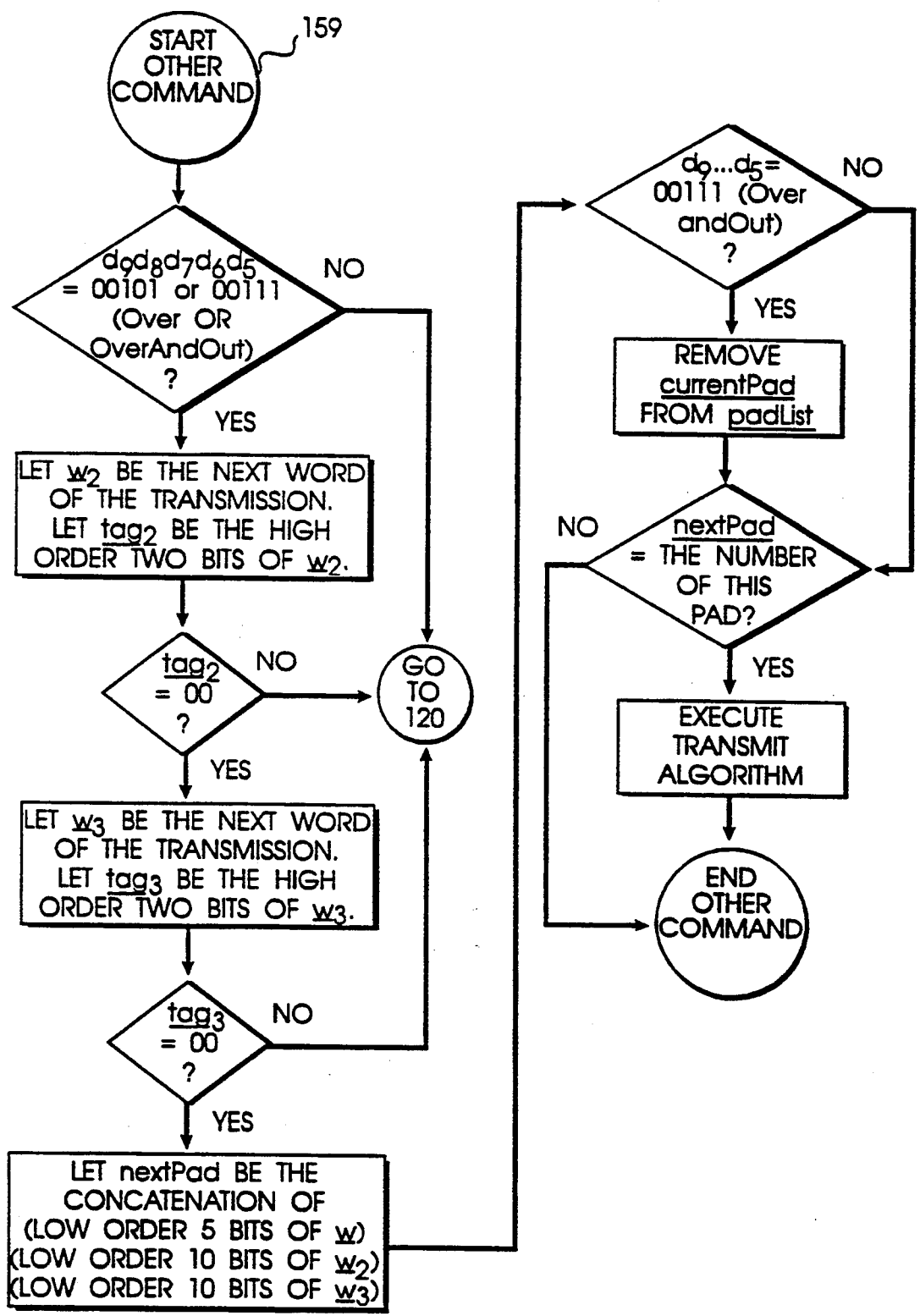

If the word received by a pad is not a conversation number, pad number or coordinate pair, the received word is a command. The listening pad then branches from the listening algorithm of FIG. 4 to the command algorithm in step 128. FIG. 6 contains a flow chart of the command algorithm. When the listening pad receives a draw or erase command, step 150 notes this mode in DM[currentIndex]. When the listening pad receives a brush size command step 154 stores the size in BS[currentIndex]. The listening pad records all commands that it receives or transmits, sorted by the conversation to which they belong. If the current conversation is password-protected, then the last ten bits of all command words, except for pad number and conversation number, are encrypted. If the commands are encrypted, the listening pad records them in their encrypted form. This record has several uses: if the user joins a conversation but forgets to give the password at first, the password can be given later and the pad can replay all stored commands using the password to decrypt them; and the pad can replay the commands later for the benefit of users who enter the conversation at a later time.

Figures 1, 7:
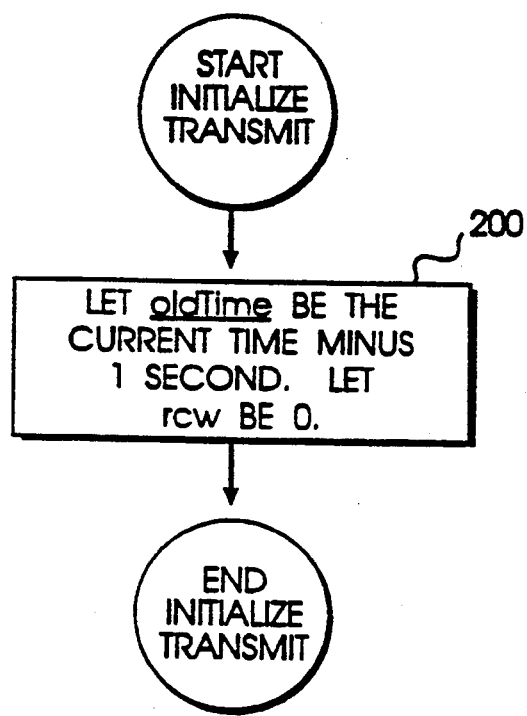
FIG. 7 is a flow chart of a transmitting algorithm according to an embodiment of the present invention.
Figures 2, 7:
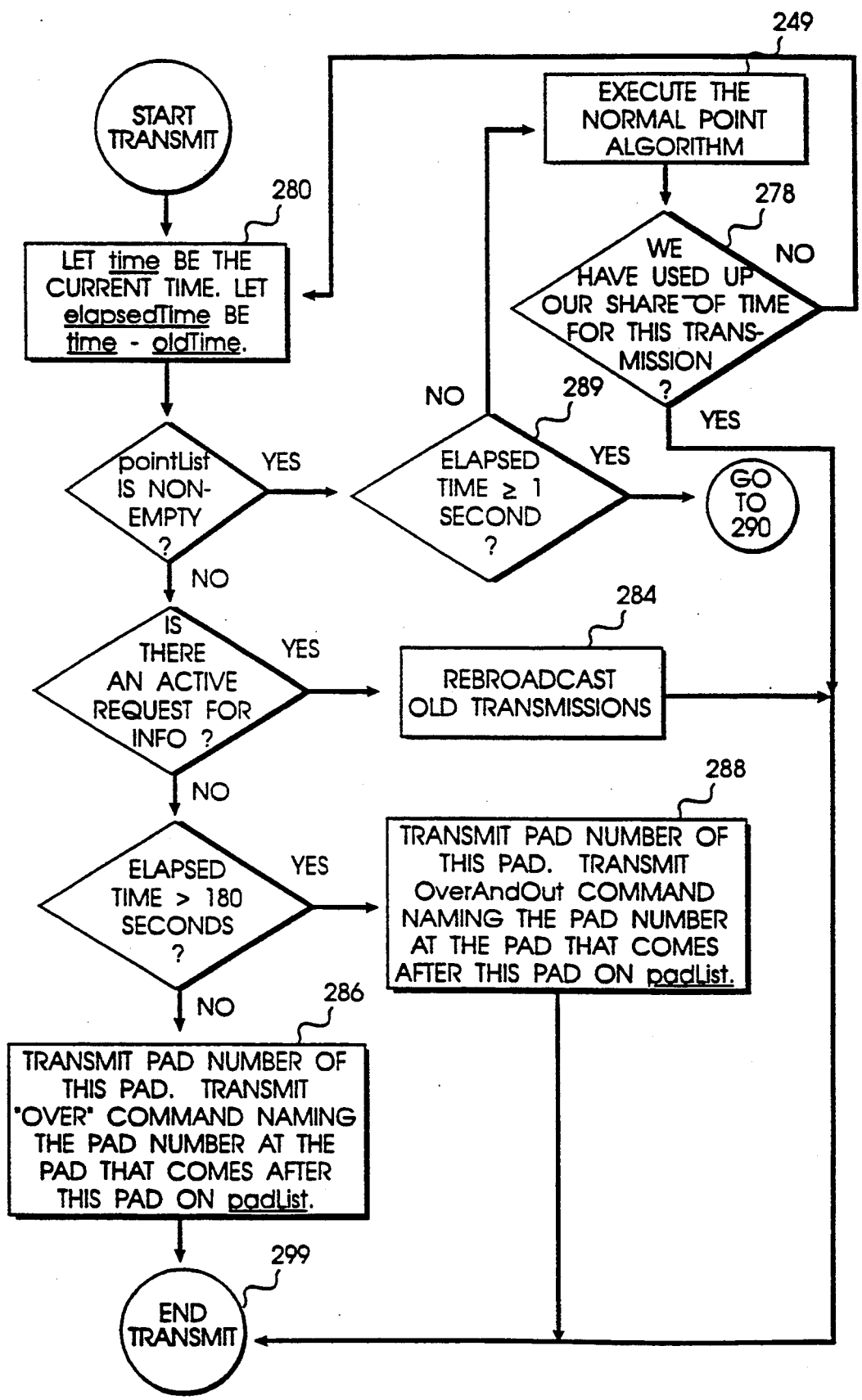
Figures 3, 7:
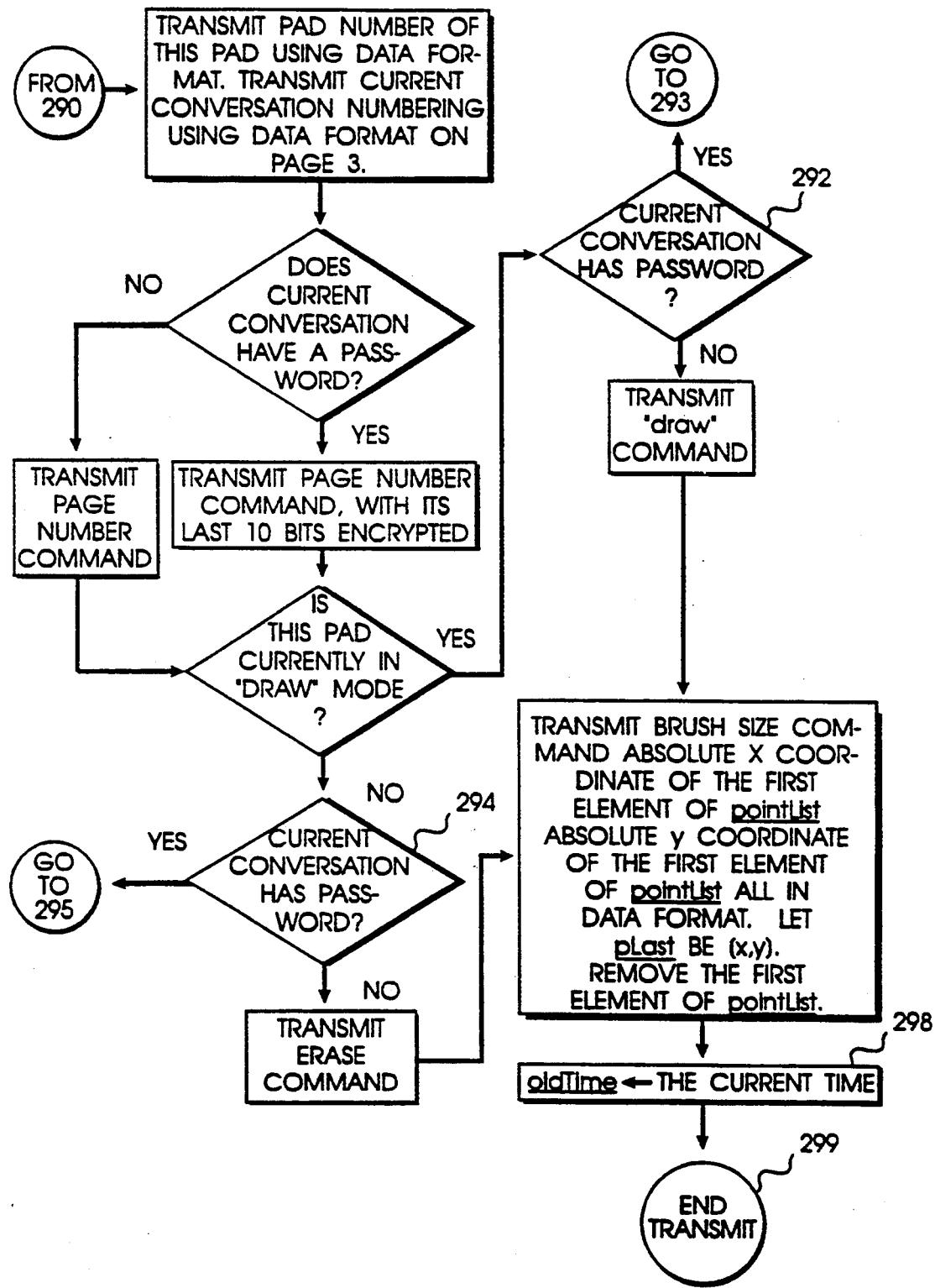
Figures 4, 7:
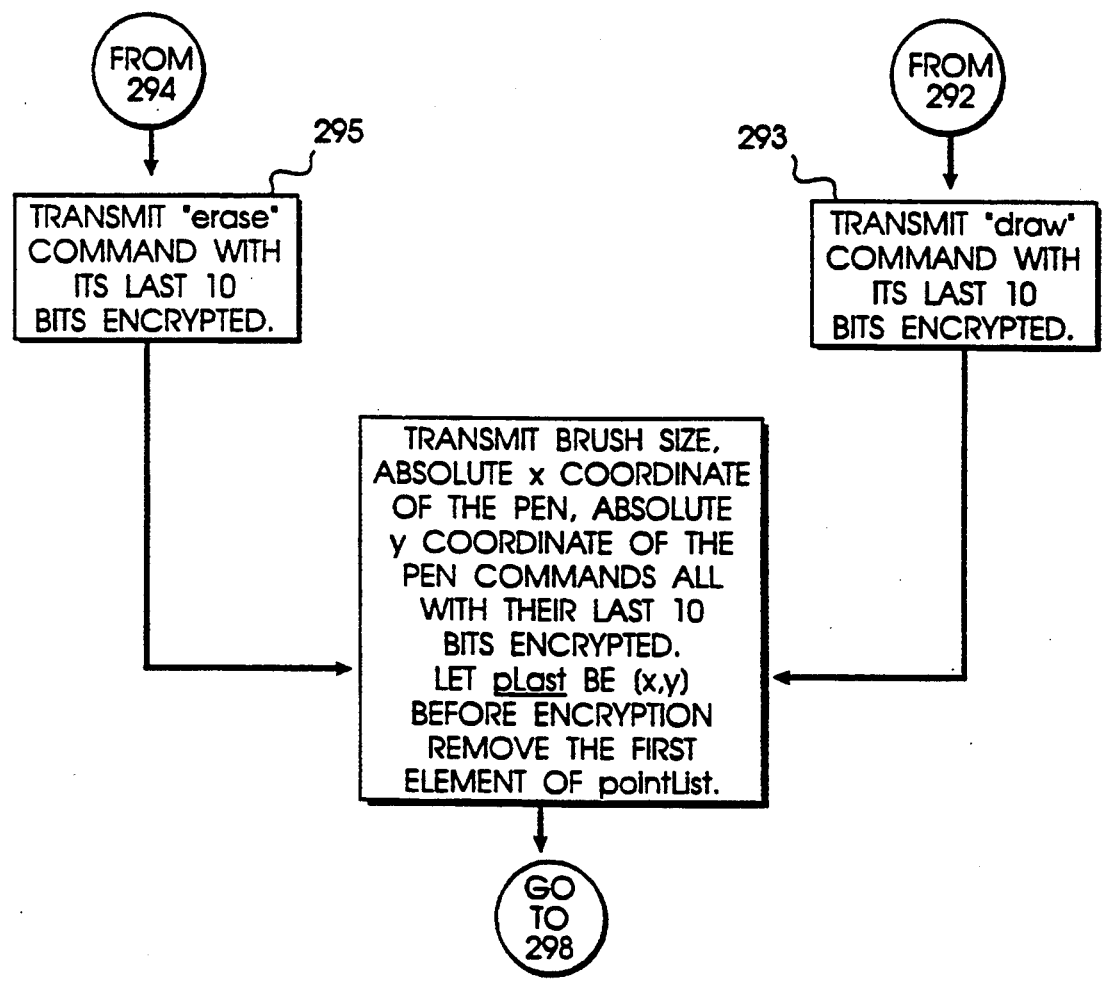

When a user is drawing, the user's pad 8 stores up the pen positions for broadcast to other pads. The operations executed by a broadcasting pad are shown in the flow chart of FIG. 7. In particular, while the pen's tip switch is on (i.e., the user is pressing the pen to the pad), the pad samples the position of the pen's tip at a constant rate (e.g., 20 times per second). Whenever the tip position at a given sampled point in time differs from the tip position at the previous sampled point in time, the pad assembles a data structure representing the new point position. The data structure contains the new coordinates (x,y) of the pen tip, the page number and conversation number of the electronic sheet of paper on which drawing was done, a boolean value representing whether the current mode is "draw" or "erase" and the current brush size. The pad stores this data structure at the end of a list, pointList.

Figures 1, 8:
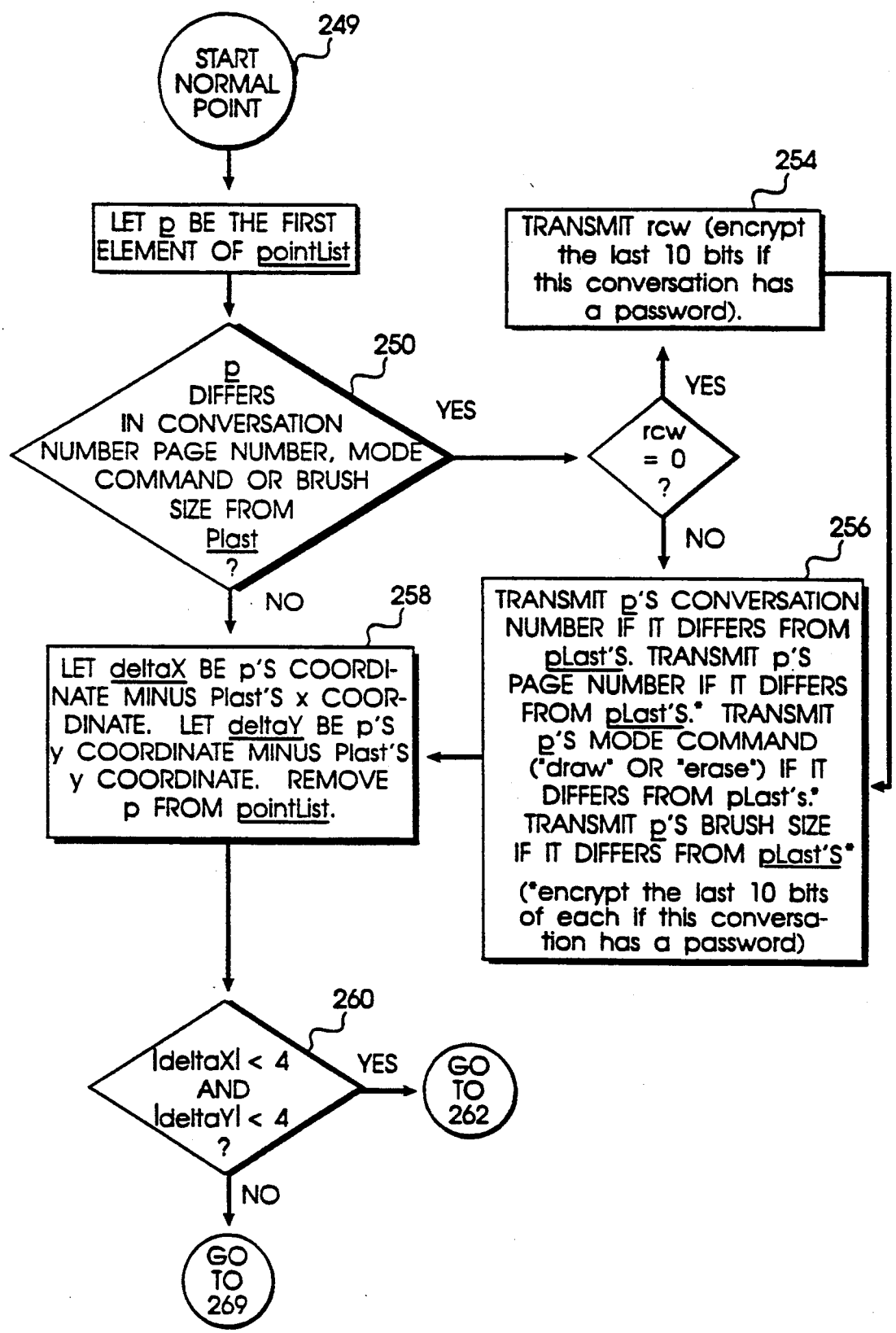
FIG. 8 is a flow chart of a point transmission algorithm according to an embodiment of the present invention.
Figures 2, 8:
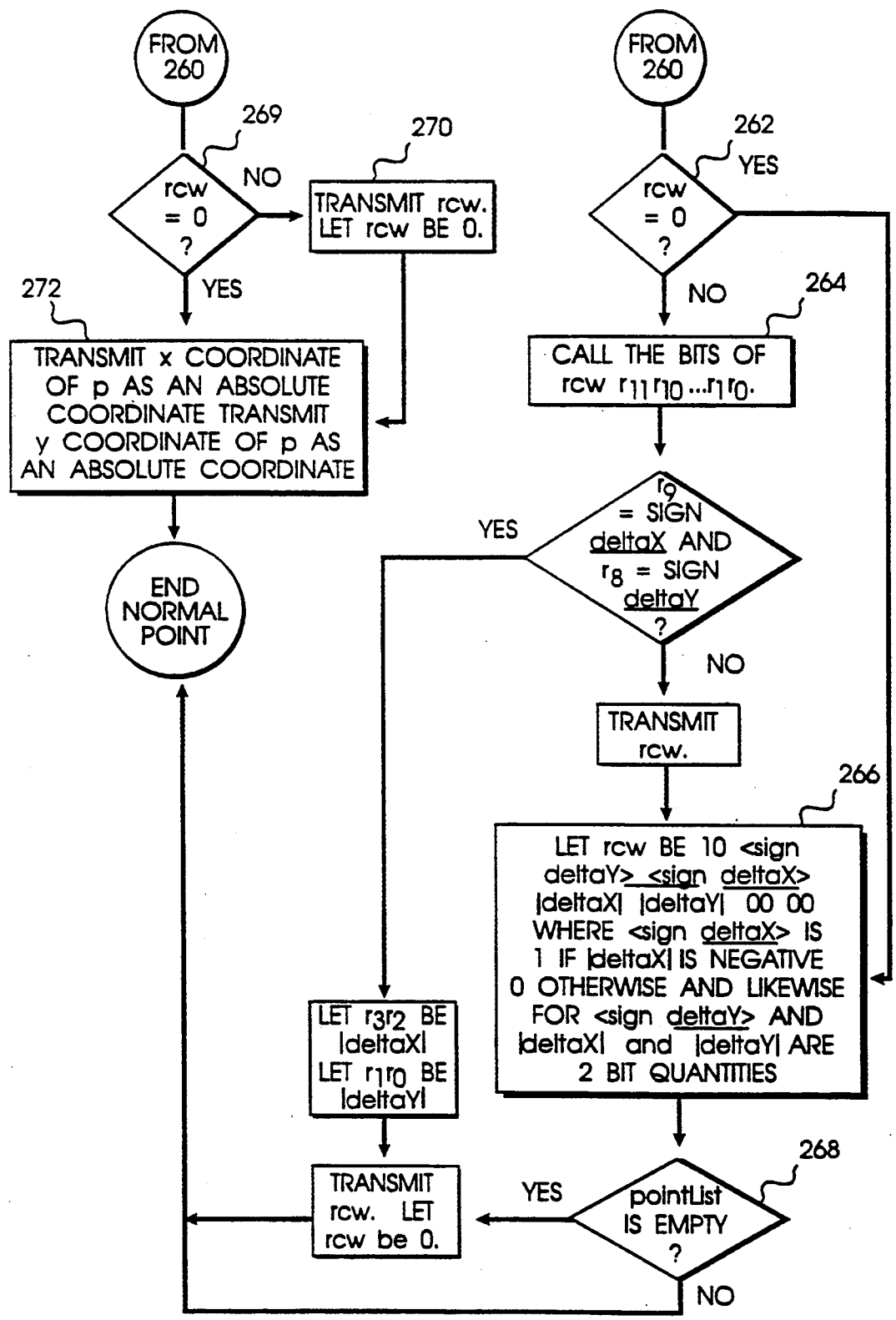

If the transmitting pad has not transmitted before this conversation, or if the pad has not made a complete start in over a second step 200, when the pad transmits, the pad examines the first point $P_O$ on pointList and emits data according to a complete start algorithm. If the pad has transmitted within the previous second, an abbreviated start algorithm is used. When a broadcasting pad makes a complete start, it transmits: its pad number (36 bits), the conversation number (12 bits) of $P_O$, the page number (12 bits) of $P_O$, a draw command if $p_O$'s mode is "draw" or an erase command if it is "erase" (12 bits), the brush size of $P_O$ (12 bits), the x coordinate of $P_O$ (12 bits), and the y coordinate of $P_O$ (12 bits). In an abbreviated start, the broadcasting pad transmits its pad number and then transmits data for $P_O$ according to the Normal Point Algorithm 249 described below, and as diagrammed in FIG. 8.

Let $p_{last}$ be the data structure that the broadcasting pad most recently transmitted and let p be the point to be transmitted. If p differs in either conversation number, page number, mode command ("draw" or "erase"), or brush size from $p_{last}$, (step 250) then the pad emits any relative coordinate words that are active (see step 254). Next, the pad emits p's conversation number if that number differs from $p_{last}$'s conversation number. See step 256. Similarly, the pad emits p's page number if that number differs from $p_{last}$'s page number, emit p's mode command ("draw" or "erase") if it differs from $p_{last}$'s mode command, and emits p's brush size if it differs from $p_{last}$'s brush size.

In all cases the pad, in step 258, computes deltaX, p's x coordinate $p_{last}$'s x coordinate, and deltaY, p's y coordinate minus $p_{last}$'s y coordinate If |deltaX| and |deltaY| are both less than 4 (step 260), these values are encoded as 2 bits each plus a third bit for sign. See steps 262–266. The encoded values are packed into the first half of a relative coordinate word (rcw) if no such word is active. This new word now becomes the active relative coordinate word of the pad. The encoded values are pacted into the second half of the active relative coordinate word if the active word exists. If the active relative coordinate word is now full, or if p is the last point in pointList (step 268), the word is transmitted at this time. Otherwise, the pad postpones its transmissions until the next point is seen. If either deltaX or deltaY are greater than or equal to 4 as determined in step 260; or if the sign of either deltaX and deltaY disagree with the signs of the previously stored deltaX or deltaY respectively, the pad transmits the active relative coordinate word (if any) step 270 followed by the absolute x coordinate of p and the absolute y coordinate of p. See step 272. After executing the normal point algorithm, the pad returns to the transmit algorithm of FIG. 7. If the pad has no more available transmission time, the broadcast will cease. When a pad finishes transmitting, the pointList is empty. If the pad has not consumed its allotted time to broadcast (step 278), it will return to step 280 and continue to broadcast. If the pointList is empty when the pad's turn to transmit comes, the pad can retransmit old commands for the benefit of newcomers (step 284). If some pad other than the broadcasting pad has recently sent a Request For Info, the broadcasting pad may decide to rebroadcast old commands. To rebroadcast, the pad goes through, in order, all of the commands it has either transmitted or received pertaining to the requested page of the requested conversation. The broadcasting pad then transmits all these commands, in reverse order, almost as if they had been drawn directly on the broadcasting pad. However, to differentiate these "review" commands from normal commands, the broadcasting pad broadcasts the "Review" command near the beginning of each packet, just after the pad number. Also, because there may be a large quantity of data to transmit, the broadcasting pad transmits only a predetermined maximum number, k, of data points during its turn and then gives the "Over" command. Other pads that have up-to-date information on the requested page of the requested conversation can listen to the Review, and determine how far the broadcasting pad has gotten in the Review. These pads may choose, when their turn comes, to continue the review if they have no new data to transmit. When any pad broadcasts the most recent point of a page, that pad gives the EndReview command, and the review is done.

Note that even a pad that doesn't understand a conversation (because it doesn't have the password) can still re-transmit the conversation to other pads. This pad doesn't know what page number the data is for, but can rebroadcast all pages of the conversation and let the receiving pads take from this broadcast the data that they need. The transmission of password and nonpassword protected data is described in steps 290–299 of FIG. 6.

If the user has recently been scribbling on the pad, and the pointList is currently empty, a pad will broadcast its pad number when its turn comes and use the Over command to identify which pad should have the next turn step 286. After a period of time (perhaps 2 or 3 minutes), if the pointList continues to be empty, a pad may wish to drop out of the conversation cycle in order to provide more communications bandwidth to the pads that are actively transmitting. In this case, the pad broadcasts its pad number, and the OverAndOut command, which names a pad to transmit next. See step 288.

Figures 1, 9:
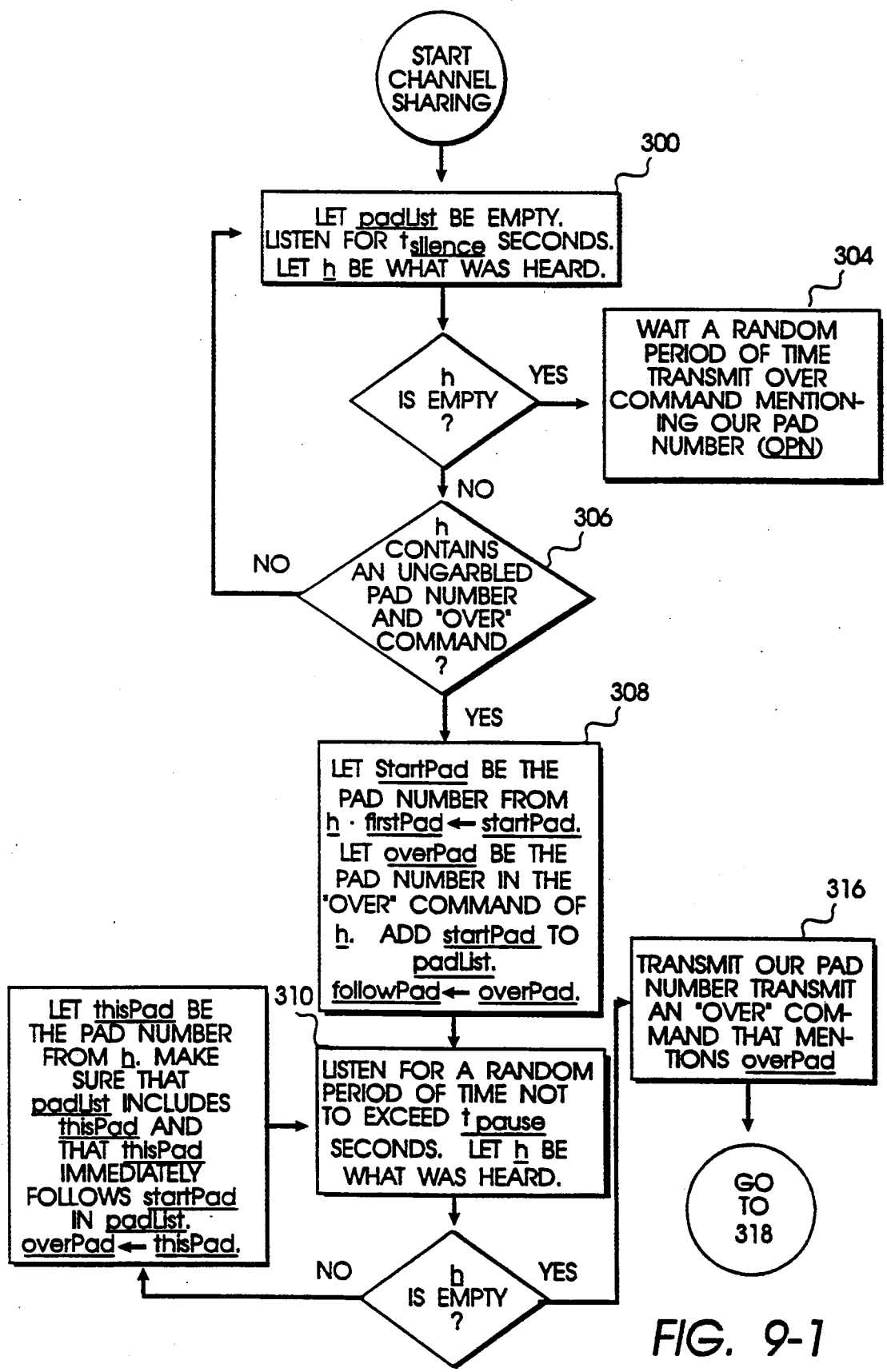
FIG. 9 is a flow chart of a channel sharing algorithm according to an embodiment of the present invention.
Figures 2, 9:
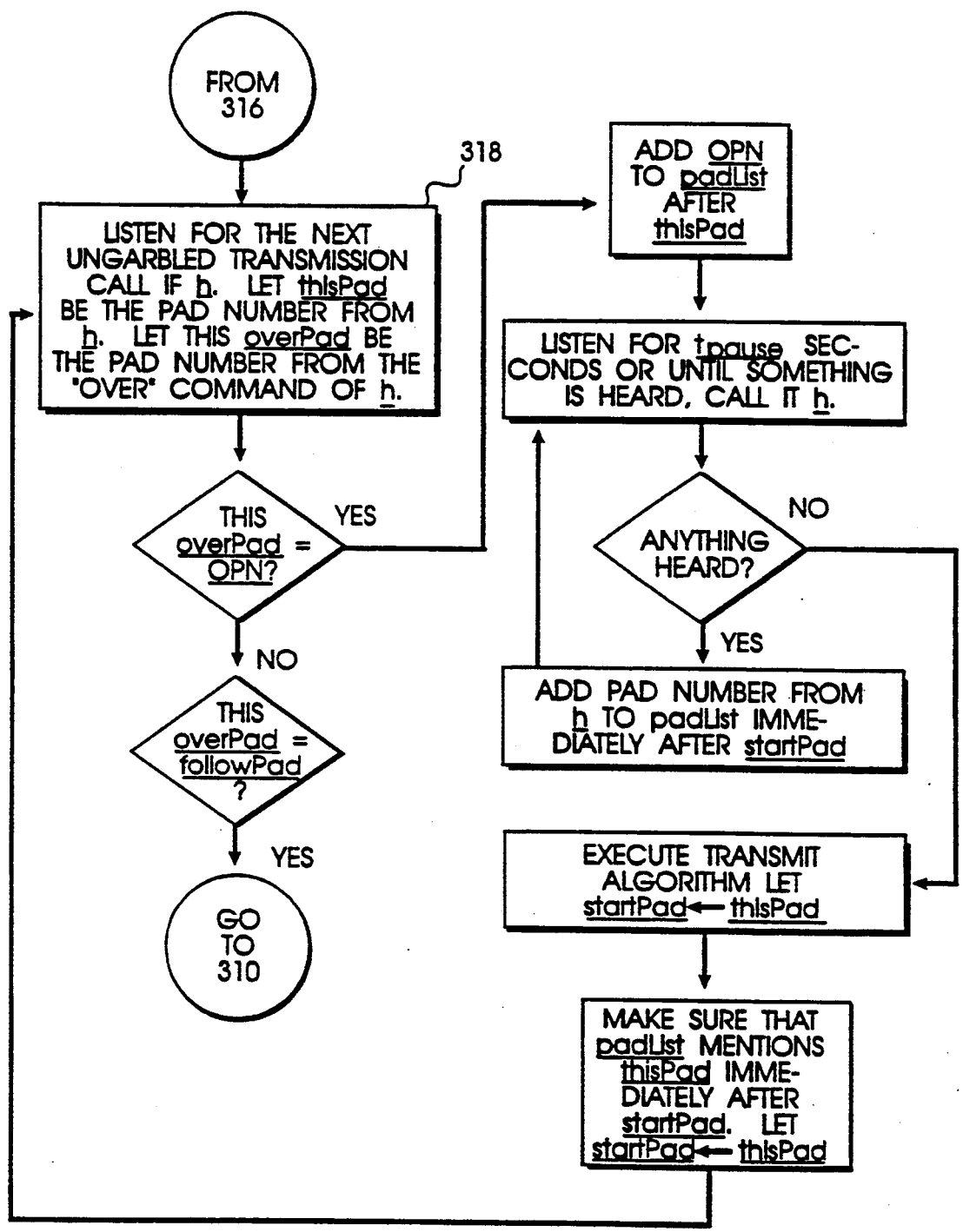

However, getting the pads to take turns is not trivial, because there is no centralized system to help the pads coordinate. The pads work out a conversation order among themselves. FIG. 9 diagrams the channel sharing algorithm used by pads 8 to work out a conversation order.

Each pad keeps track of the other pads that it knows are transmitting nearby. When a pad transmits its pad number, each pad notes that number for future reference. Each pad keeps a list padList of the other pads that are transmitting. The order of this list indicates the turn-taking order that the pad has deduced from listening to transmissions. Pads also keep track of the broadcast of "Over" commands to deduce the current turn-taking order.

When a pad has not heard any other pad transmit for a period of time, the pad sets its padList to the empty list. See step 300. At random intervals, the pad transmits its pad number, followed by an "Over" command that mentions its own pad number. See step 304. If another second pad enters the room and follows this same algorithm, eventually the first pad will hear a complete transmission from the second pad. See step 306. If the first pad hears nothing for too long it goes back to broadcasting its pad ID at random intervals. If the first pad has heard the transmission clearly, the first pad then adds the second pad's number to its padList in step 308. The first pad's padList now contains just the second pad's number. The second pad will pause briefly in between transmissions for at least a minimum period of time to allow other pads to announce themselves. The first pad now takes advantage of this pause to announce its pad number to the second pad. On hearing this, the second pad adds the first pad to its padList. The second pad's padList now contains just the first pad's number. The next time the second pad broadcasts the "Over" command, it broadcasts the first pad's number instead of its own. See step 316.

At this time, the first pad adds its own number to its padList after the new pad's number. The first pad performs a transmission and mentions the new pad's number in its Over command when it is done. Now the new pad adds the new pad's number to its padList after its entry for the first pad. At this point, both pads have padList={first pad,new pad}. The pads have established a conversational order and can now converse without collisions until they are taken too far from each other, turned off, or until another pad or pads enters their range.

When a pad $P_o$ has just been turned on, has just heard another pad after a long period of not hearing any pads, or has been listening quietly because its user isn't using its pen, the pad listens for a complete transmission, as described above. If the pad is in an area where many pads have settled into a conversation, the next transmission could come from any existing pad, call it $P_i$. Pad $P_o$ will note down $P_i$'s number in its padList. When $P_i$ broadcasts the Over command and names pad $P_{i+1}$, pad $P_o$ executes step 310 and waits a random time (not to exceed the normal pause, T, that actively conversing pads wait after an Over command) and broadcasts its pad number and an Over command mentioning $P_{i+1}$. $Pad_{i+1}$ then waits for an additional pause period of length T (in case additional pads wish to join the conversation) and, after any further interruptions are handled, proceeds with its broadcast. Meanwhile, all of the pads add $P_o$ after $P_i$ in their padList. The next time $P_i$ transmits, it specifies $P_o$ in its Over command. This sequence is reasonably safe since $P_o$ has already demonstrated its knowledge that it should pass control to $P_{i+1}$ by doing this in its Over command above. After $P_o$ transmits, $P_o$ passes control to $P_{i+1}$ and conversation can now proceed normally.

One potential problem with this scenario occurs if several pads try to join the conversation at once. If they all broadcast their numbers after $P_i$'s "Over" command, the broadcasts may conflict with each other. In this case, other pads may hear a garbled pad number, a garbled "Over" command or both. If the pad number or Over command is ill-formed, the other pads can ignore the transmission altogether. The new pads can simply try again, waiting both a random number of "Over" commands and a random amount of time after their chosen "Over" command in order to improve their chances of being heard clearly. If the Over command is well-formed, but incorrect, the other pads can detect this (since they know that $P_{i+1}$ should come next) and can ignore this transmission as well.

If the pad number is well-formed but incorrect, and the Over command is correct, the other pads may accidentally add the wrong pad number to their padLists. As a result, $P_i$'s "Over" command will describe an incorrect pad. However, when no pad transmits in response to this Over command $P_{i+1}$ takes its turn (being next in order) and all pads will delete the faulty pad from their lists. At this point, $P_o$ will know to try again.

Pad $P_o$ can leave a conversation in several ways. It can decide to be quiet for a while, or it can stop participating unexpectedly because it is carried away or turned off. If a pad decides to be quiet, its ends a transmission with the OverAndOut command. Other pads delete it from their padLists and the pad before $P_o$ will know to mention the next pad after $P_o$ the next time it gives an Over command. If a pad stops participating unexpectedly, the other pads discover this fact because it does not broadcast when asked to by an Over command. After a short delay, the pad scheduled to broadcast after $P_o$ will broadcast. All participating pads will remove $P_o$ from their padLists.

Description of Operation Using Illustrative Examples

The operation and features of the present invention are best illustrated by the three hypothetical examples given below. These three examples describe starting and ending a conversation, conducting password protected conversations, participation in multiple conversations and communications in crowded areas.

Example 1

Alex is attending a conference with his coworkers Bob, Christy and Dave. The conference seating is such that neither Alex, Bob, Christy nor Dave is seated within speaking distance of one another. Alex would like to suggest a place to meet for lunch to his coworkers, yet verbal communication across the conference room during the conference would be highly inappropriate. Fortunately, however, each person is equipped with a pad 8.

Figure 10:
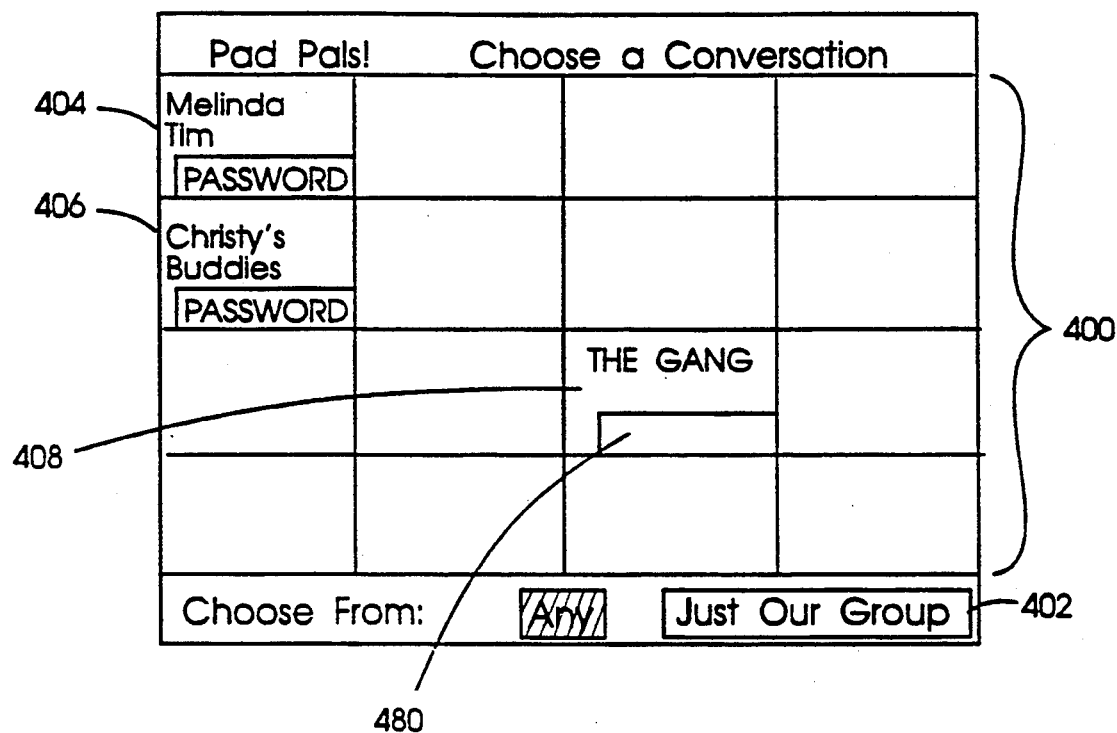
FIG. 10 is a view of a conversation menu display according to an embodiment of the present invention.

To begin a conversation, Alex turns on pad 8 using switch 18. FIG. 10 shows a display generated by CPU 45 software on display 10 when pad 8 turns on, according to one embodiment of the present invention. Other displays are possible. The initial display of FIG. 10 comprises a number of blocks 400. Each one of blocks 400 contains information on one of the n possible numbers of conversations. A lower region 402 indicates the display mode of Alex's pad 8. Pad 8 may display the conversation information for all conversations received by the pad or only those received conversations contained in previously determined select group. Blocks 400 in combination with lower region 402 form a conversation menu from which Alex can chose to enter existing, conversations; or, if a slot is available, start a new conversation.

In the display screen of FIG. 10, the "Any" option is shaded in region 402 of Alex's screen. Alex's pad 8 therefore displays conversation information for all of the conversations received by transceiver 55 of pad 8.

From the information contained on the screen of FIG. 10, transceiver 55 of Alex's pad, is currently monitoring three conversations: Melinda and Tim; Christy's Buddies; and the Gang. Pertinent information for these conversations are given in blocks 404, 406, and 408 respectively. Blocks 404 and 406 display the word "password," which indicates that Alex must know the previously agreed upon password to participate in either of these conversations. The conversation of block 408 does not require that a password be entered and anyone who wishes can participate in this conversation.

Figure 11:
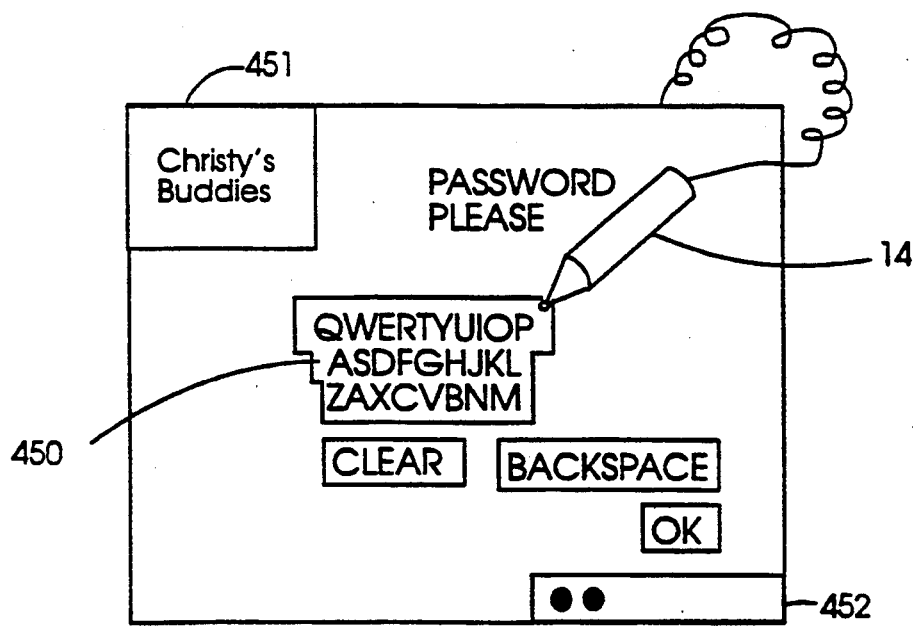
FIG. 11 is a view of a log-in screen requiring password entry according to an embodiment of the present invention.

Alex suspects that the group listed as Christy's Buddies in block 406 may include Christy, Bob and Dave, so Alex selects the block 406 using stylus 14. Because this conversation is password protected, pad 8 prompts Alex to enter the required password on a simulated keyboard 450 as may be seen in FIG. 11. The selected conversation is displayed in a box 451, which appears in the upper right-hand corner of the display. Alex enters the password in region 450 using stylus 14. A feedback region 452 displays one shape for each character of the password Alex enters.

Figure 12:
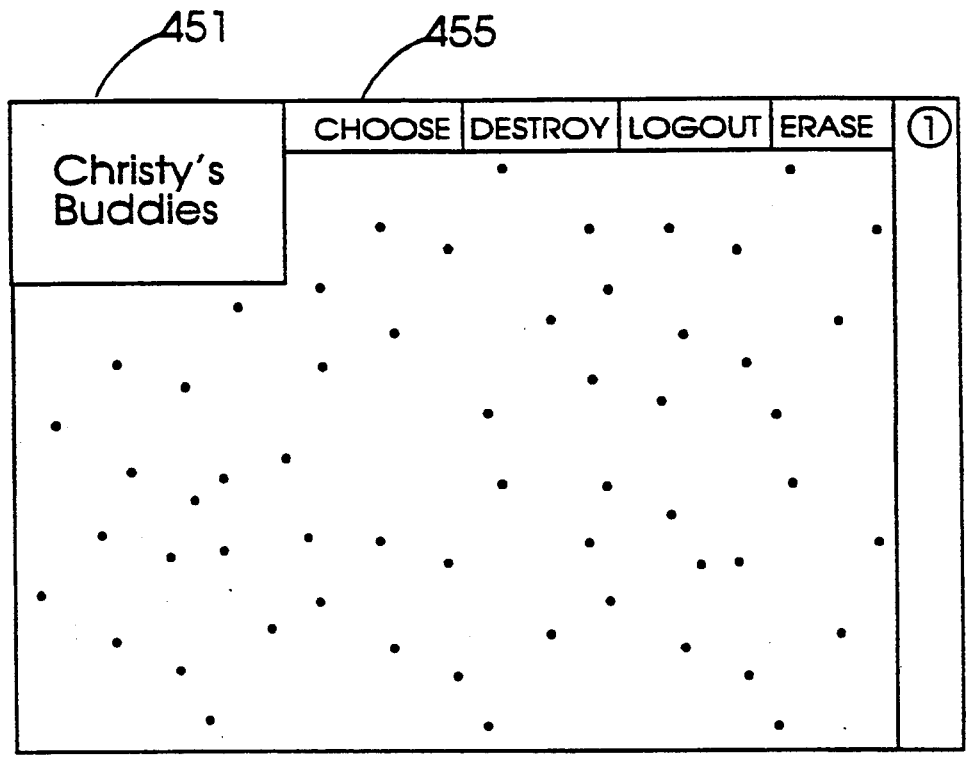
FIG. 12 is a view of a screen which appears after incorrect password entry according to an embodiment of the present invention.

If Alex enters an invalid password, the data for the Christy's Buddies conversation appears as a pattern of random dots. See FIG. 12. Alex can then select the "Choose" command 455 to return to the conversation menu of FIG. 10 and attempt the conversation selection and password entry process again.

After Alex successfully enters the agreed upon password, pad 8 displays the most recent page of scribbles from this conversation. See FIG. 13. Alex can select previous pages of conversations by using the menu of pages 460. From the page currently displayed, however, Alex can see that Christy, Dave and Bob have already agreed on a meeting place for lunch. Alex can add his own scribbles using stylus 14 to indicate that he would like to join the others at lunch. Since the current page appears full, Alex begins a new page by selecting a rectangle 460 which does not yet have a number. The new page showing Alex's scribbles and the responses by others in the group appears in FIG. 14.

Figure 13:
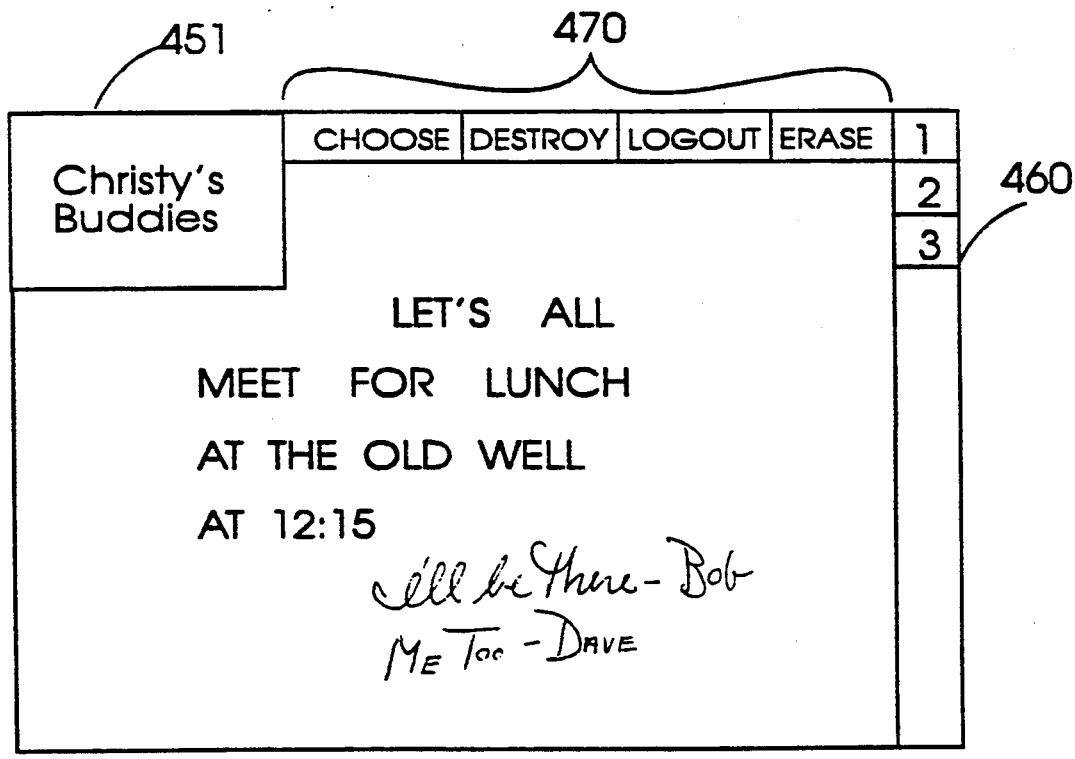
FIG. 13 is a view of a conversation screen according to an embodiment of the present invention.
Figure 14:
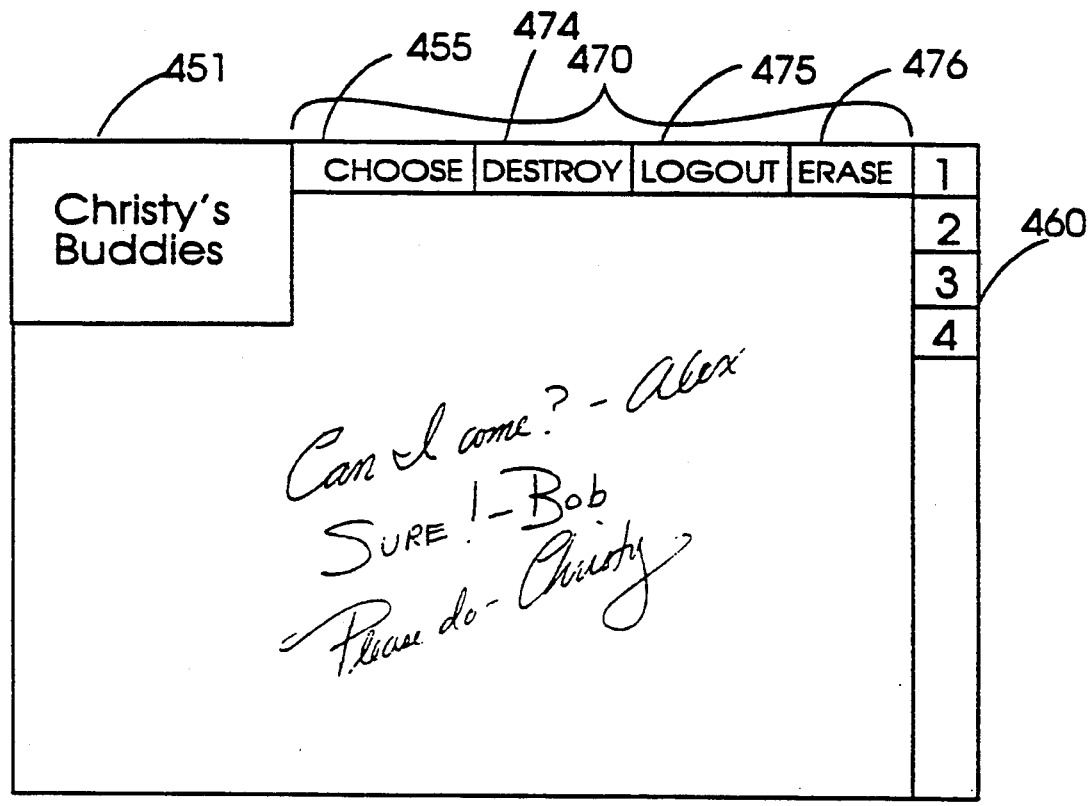
FIG. 14 is a view of a second conversation screen according to an embodiment of the present invention.

Note that in the conversation screens of FIGS. 13 and 14, a menu 470 appears at the top of the screen. Alex can select "Choose" in menu box 455 to return to the initial screen; can select "Destroy" in box 474 to destroy this conversation; or can select "Log-out" in box 476 to cause his pad to forget the password for the Christy's Buddies conversation. The log-out feature allows Alex to hand his pad to another user without giving them the means to eavesdrop on the password protected Christy's Buddies conversation. The "Erase" command in box 476 erases the current page of scribbles Selection of "Erase", "Log-out" or "Destroy" will cause pad 8 to prompt Alex to confirm the command entry.

Example 2

Alex, Dave, Bob and Christy have all met for lunch and are now seated back in the conference room. Alex is confused by something the lecturer has just stated and would like some help understanding the material. Alex can begin a new conversation by turning on his pad 8 and selecting an empty conversation square from the initial conversation menu screen, an example of which was depicted in FIG. 10. If Alex wishes to start a new conversation, Alex can select the "Chose" command in box 455 to return to the conversation menu and select an empty conversation square.

Figure 15:
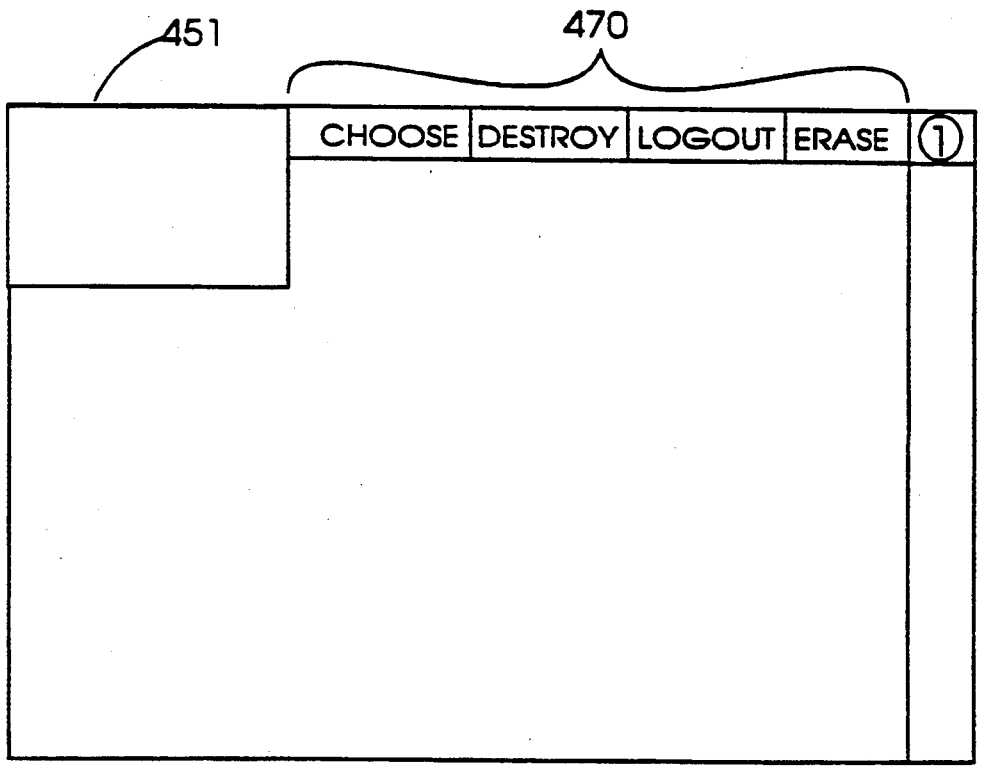
FIG. 15 is a view of an initial conversation screen according to an embodiment of the present invention.
Figure 16:
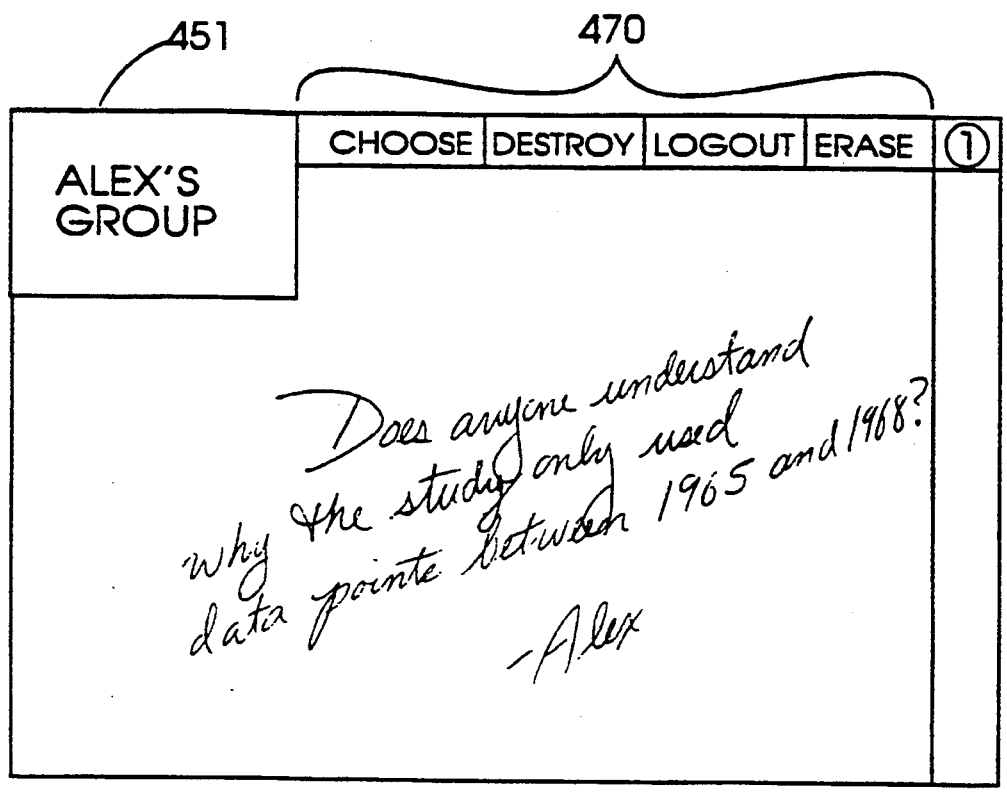
FIG. 16 is a view of a third conversation screen according to an embodiment of the present invention.

After selecting an empty conversation square, pad 8 displays an empty writing screen as may be seen in FIG. 15. Alex can then scribble his name in box 451 as an advertisement for the new conversation. Most likely, Alex will not want everyone in the room with a pad 8 to be alerted to his confusion and desires to direct his question to the limited group consisting of Christy, Bob or Dave. Alex will therefore need to enter a password. To enter the password, Alex returns to the conversation menu screen of FIG. 10 and selects the empty password box. See FIG. 10 reference number 480 for an example of an empty password box. Pad 8 then prompts Alex to enter a password using a screen as appears in FIG. 11. Since Alex desires to communicate with Christy, Dave and Bob, Alex enters the previously agreed upon password. Optionally, however, Alex could enter any password he wished. After entry of the password, the display appears as in FIG. 16. The screen is shown as it appears after Alex has scribbled his question using stylus 14. Alex's friends Bob, Christy and Dave can see that Alex has started a new conversation by looking at their conversation menus.

Example 3

On the weekend, Alex takes his wife Erin and their two children Frank and Gervase to the county fair. The possibility exists that many other people at the fair may be using pads 8 and therefore, many more than the allotted pad total of sixteen conversations may be extant on the default pad frequency. To stay in touch, therefore, each member of Alex's family switches their pads 8 to a given one of the optional broadcast frequencies which can be selected when using pad 8. The broadcast frequencies, or spread spectrum modulation numbers, are preset and users may select between those preset frequencies provided with each pad.

When Alex and his family wish to start or enter a conversation, they select the "Just Our Group" option. See FIG. 10. In the "Just Our Group" mode of operation, pad 8 will broadcast and monitor conversations only on the predetermined frequency. If Alex and his family are lucky, no one else in the park will be having a conversation on the frequency and at the conversation number in use by Alex and his family. Alex's family will then be able to draw conversations to each other clearly throughout the day.

Figure 17:
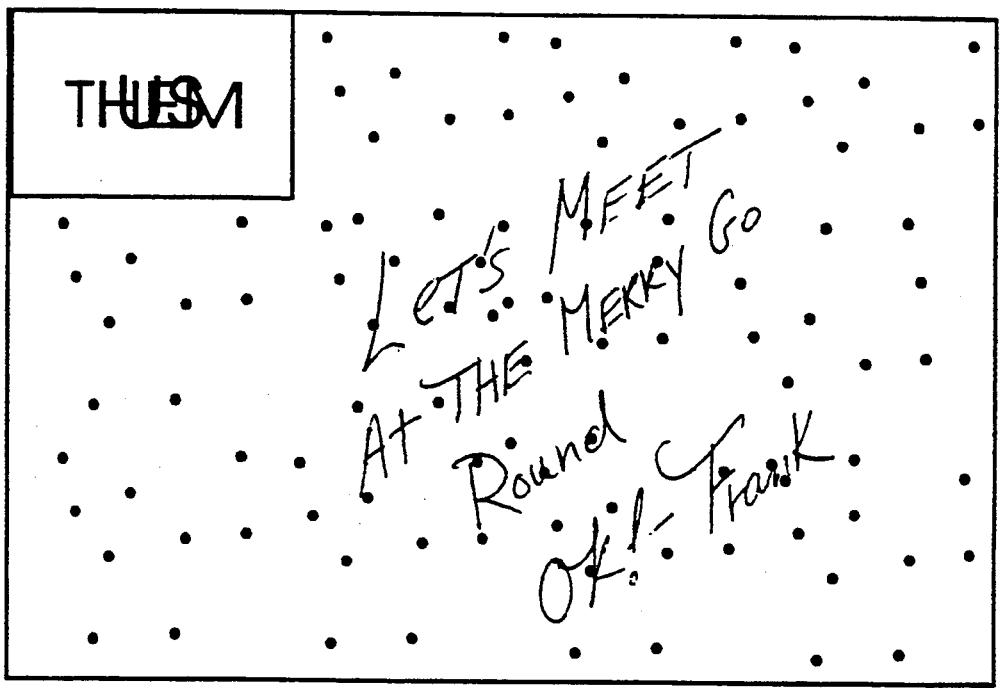
FIG. 17 is a view of a conversation screen having two conversations broadcast on the same frequency and having the same conversation number.

If another group is broadcasting on the same channel and at the same number, pad 8 will reposition one of the conversations on the conversation menu to resolve the conflict. If the conversation menu is full, and one of the conversations cannot be repositioned, the other group's broadcast information will appear as background salt and pepper noise on Alex's family conversation provided that the other group is not using the same password. See FIG. 17. Furthermore, if the conversations are page numbered, the salt and pepper background noise may appear on a different page than that currently being viewed by Alex and his family. In such an event, the impact on Alex and his family is further reduced.

Alex and his family may also not wish to carry on a running conversation throughout the day. Pad 8 may therefore optionally be equipped with a speaker which will emit a noise when a new page has been added to an existing conversation. In this manner, other members of the family are alerted when one member adds to the conversation.

Suppose Frank and Gervase go off to the concession stands while Alex and Erin tour the exhibits. Alex and Erin wish to have one conversation with Frank and Gervase to keep tabs on their whereabouts and another conversation between themselves. These conversations are begun in the manner described in Example 2.

While touring the exhibits, Erin writes Alex a note describing the woodworking exhibit she is viewing. While Alex is reading the conversation screen containing this note, the speaker on Alex's pad 8 sounds alerting him that a new page has been added to the Alex, Erin, Frank, and Gervase conversation. Alex can deselect his conversation with Erin by entering the "Choose" command which returns him to the conversation menu where he then selects the conversation taking place amongst all family members. The most recent page is displayed on Alex's screen. Looking at the screen, Alex sees the following message: "We are going to ride the rollercoaster." Alex is sure he has instructed Frank and Gervase not to ride the rollercoaster without him and can page back through the conversation using the page menu 460. See FIG. 13 for an example page menu. On an earlier page of the conversation, Alex has indeed issued this instruction. Alex creates a new page by selecting an unnumbered rectangle from the page menu and scribbles a new message to the boys: "Wait for me."

Erin has been alerted to the activity on the conversation involving all the family members by activation of the speaker on her pad 8. She can view this conversation by using the same procedure followed by Alex. However, to be sure Erin knows where he is going, Alex returns to the conversation menu and selects the Alex/Erin conversation to write Erin a note about where he is going. Alex, Erin, Frank and Gervase have thus been able to participate simultaneously in several conversations using pads 8.

An embodiment of the present invention has now been described. Variations and modifications will be readily apparent to those of skill in the art. For these reasons, the invention should be construed in light of the claims.

TABLE 1

| Data | Description |
|---|---|
| Conversation Number: | This number identifies a set of "sheets" of shared electronic "paper" that many participants can write on. If a conversation has a password, then conversation participants who have given the password can read and write on any of the pages of that conversation. Each conversation can have a ten bit conversation number. With conversation numbers chosen from a relatively large set of numbers, a pad can be taken from room to room with little risk that conversations in the new room will have the same numbers as conversations in the old room. Minimizing the risk of duplicate conversation numbers prevents scribbles in the new room from over-writing pages previously written on in another room. As further protection, pads can have a "go back" and "undo" feature allowing a conversation to be played in reverse to get back to a previous state. |
| Page Number: | Page 0 of a conversation is the rectangular region that the pad displays on its Overview display to advertise the conversation. Pages 1, 2, 3 are the pages on which participates write and draw their graphical communications. For conversations less than 32 pages, 5 bit page numbers can be used. |
| Brush Size: | This number describes the brush diameter in pixels. Subsequent x-y coordinates produce marks or erasures using a brush of this diameter. A 5 bit brush size may be used. |
| Absolute x-y Coordinates: | These coordinates are sent when the pen is active and moves to a new position on the pad. For a 512 × 512 pixel screen, 9 bits may be used to represent the x or y coordinate. |
| Relative x-y Coordinates: | These coordinates are expressed in terms of their difference in x and y from the last coordinates sent. Because the pen often moves smoothly across the pad, such coordinates will often take fewer bits to transmit and hence can be used to reduce data bandwidth requirements. For example, the pen will often move less than 4 pixels in both x and y from one sampling time to the next. Also, each coordinate will tend to increase for a while and then decrease for a while rather than alternating rapidly from increasing to decreasing. Thus, several x-y pairs of coordinates may be sent with a single sign bit for x, a single sign bit for y, and then 2 bits per coordinates (representing motions of from 0–3 pixels in each coordinate) for several pairs of x and y. |
| Pad Number: | This number is unique to a particular pad. The number is used when a pad enters or exits the transmission range of other pads in order to help the pads determine a way to divide up the available communication channels. A 25 bit number allows a unique identifier for over 32 million pads. |

TABLE 2

| Command | Description |
|---|---|
| Draw Command: | The draw command is transmitted when a user selects the draw mode on his or her pad. Subsequent x-y coordinates are interpreted as commands to produce black marks on a shared sheet of paper. |
| Erase Command: | The erase command is transmitted when a user selects the erase mode on his or her pad. Subsequent x-y coordinates are interpreted as commands to produce white marks on a shared sheet of paper. |
| ErasePage Command: | This command immediately erases all pixels on the stated page of the current conversation. |
| Request for Info: | This command is a request to other pads to retransmit information about an existing page of an existing conversation. The request includes the page number. The conversation number precedes this request. |
| Request for Conversation Line: | This command is a request to other pads to describe the conversation numbers of all of the public conversations in which those pads are currently participating. A newcomer can use this command to learn what conversations are available. This command may be followed by a Request for Info about page 0 of each current conversation. Page 0 is the small summary of the conversation that is displayed on a pad when the user requests an Overview. |
| Review: | This command indicates that the data that is about to be broadcast has been broadcast before. It is being rebroadcast for the benefit of pads that missed early parts of a conversation. |
| End Review: | This command indicates that all of the data about a requested page of a requested conversation has been rebroadcast. Subsequent commands will contain new data that has not been broadcast previously. |
| Over: | This command specifies the pad number of the pad that should speak next. The command helps pads explicitly take turns transmitting. |
| OverAndOut: | Like Over, this command specifies the pad number of the pad that should speak next and also indicates to other pads that this pad does not need its place in the transmission order. |

TABLE 2-continued

| Command | Description |
|---|---|
| | Therefore, other pads should not mention this pad when they transmit the "Over" command. |

What is claimed is:

1. A portable device for silent, graphical communication comprising:
 a screen for receiving and displaying a graphical input;
 an input device, coupled to said screen, for inputting a first graphical input to said screen;
 means, coupled to said input device, for converting said first graphical input to a first graphical data set;
 means, coupled to said means for converting said first graphical input to a first graphical data set, for transmitting via wireless communication said first graphical data set;
 means for receiving a second graphical data set, wherein said second graphical data set is broadcast from a remote location;
 means, coupled to said means for receiving a second graphical data set and to said screen, for converting said second graphical data set to a second graphical input to be displayed on said screen; and
 means, coupled to said means for transmitting and said means for receiving, for autonomously allocating a time period to transmit said first graphical data set and avoid data collisions.

2. The portable device for silent, graphical communication of claim 1 wherein said screen comprises a liquid crystal display.

3. The portable device for silent, graphical communication of claim 2 wherein said screen comprises a video display terminal.

4. The portable device for silent, graphical communication of claim 1 wherein said input device comprises an electronic stylus.

5. The portable device for silent, graphical communication of claim 1 wherein said input device comprises a track ball.

6. The portable device for silent, graphical communication of claim 1 wherein said means for converting said first graphical input to a first graphical data set and said means for converting said second graphical data set to a second graphical input comprise:
 a microprocessor; and
 a digitizer.

7. The portable device for silent graphical communication of claim 1 wherein said means for transmitting a first graphical data set and said means for receiving a second graphical data set comprise a radio transceiver.

8. The portable device for silent, graphical communication of claim 1 wherein said means for transmitting a first graphical data set and said means for receiving a second graphical data set comprise an infrared transceiver.

9. The portable device for silent, graphical communication of claim 1 further comprising:
 a microprocessor, coupled to said screen, said means for transmitting and said means for receiving a second graphical data set; and
 a memory, coupled to said microprocessor, for storing a series of graphical data sets under control of said microprocessor.

10. A portable device for silent graphical communication comprising:
 a liquid crystal display, coupled to a data bus, for receiving and displaying a graphical input;
 an input device, coupled to said liquid crystal display, for inputting a first graphical input to said screen;
 a transceiver, coupled to said data bus, for transmitting, via wireless communication a first graphical data set and receiving a second graphical data set broadcast from a remote location;
 a microprocessor, coupled to said data bus, for converting said first graphical input to said first graphical data set converting said second graphical data set into a second graphical input and autonomously allocating a time period to transmit said first graphical data set and avoid data collisions.

11. The portable device for silent graphical communication of claim 10 further comprising:
 a memory, coupled to said data bus, for storing an instruction set and a plurality of graphical data sets.

12. The portable device for silent graphical communication of claim 10 further comprising:
 a speaker, coupled to said data bus, for conveying an audio signal to a user of said device.

13. The portable device for silent graphical communication of claim 10 further comprising an antenna coupled to said transceiver.

14. The portable device for silent graphical communication of claim 10 wherein said transceiver comprises a radio transceiver.

15. The portable device for silent graphical communication of claim 10 wherein said transceiver comprises an infrared transceiver.

16. The portable device for silent graphical communication of claim 10 wherein said input device comprises an electronic stylus.

17. The portable device for silent graphical communication of claim 10 wherein said input device comprises a track ball.

18. A method for multiparty, silent graphical communication using portable devices comprising the steps of:
 writing a message on a screen of a first portable device using an input device;
 representing said message within said first portable device as a graphical data set;
 transmitting, from said first portable device said graphical data set, via wireless communication, wherein said step of transmitting comprises the step of autonomously allocating a given time interval and a given duration of time to transmit wherein a data collision is avoided;
 receiving at a second portable device said graphical data set; and
 converting said graphical data set to said message for display on a screen of said second portable device.

19. The method for multiparty silent graphical communication of claim 18 further comprising the steps of:
 writing a second message on said screen of said second portable device;
 representing said second message within said second portable device as a second graphical data set;
 transmitting from said second portable device said second graphical data set;
 receiving at said first portable device said second graphical data set;
 converting said second graphical data set into said second message for display on said screen of said first portable device.

20. The method for multiparty silent graphical communication of claim 18 further comprising the step of: assigning a conversation number to said message.

21. The method for multiparty silent graphical communication of claim 20 further comprising the step of: assigning a page number to said message.

22. The method for multiparty silent graphical communication of claim 18 wherein said step of writing a message further comprises the step of writing with an electronic stylus.

23. The method for multiparty silent graphical communication of claim 18 wherein said step of writing a message further comprises the step of writing with a track ball.

24. The method for multiparty silent graphical communication of claim 18 wherein said step of transmitting comprises the step of transmitting an infrared signal.

25. The method for multiparty silent graphical communication of claim 18 wherein said step of transmitting comprises the step of transmitting a radio signal.

26. The method for multiparty silent graphical communication of claim 20 wherein said step of displaying said message comprises the step of selecting said conversation number.

27. The method for multiparty silent graphical communication of claim 26 wherein said step of displaying said message comprises the steps of entering a password.

28. The method for multiparty silent graphical communication of claim 18 wherein the step of transmitting further comprises:
selecting a frequency from among a given set of possible frequencies.

29. The method for multiparty silent graphical communication of claim 18 further comprising the step of storing said message in memory.

30. The method for multiparty silent graphical communication of claim 20 further comprising the step of storing said message in memory by conversation number.

31. The method for multiparty silent graphical communication of claim 18 wherein said step of transmitting from said first portable device further comprises the step of transmitting a first portable device identification number and a first end of transmission signal including a second portable device identification number.

32. The method for multiparty silent graphical communication of claim 19 wherein said step of transmitting from said second portable device further comprises the step of:
transmitting said second portable device identification number and a second end of transmission signal including said first portable device identification number.

33. The portable device for silent graphical communication of claim 10 wherein an operational frequency of said transceiver can be selected by a user from among a given set of possible transceiver frequencies.

34. The portable device for silent graphical communication of claim 1 wherein said input device comprises a touch sensitive screen.

35. The portable device for silent graphical communication of claim 10 wherein said input device comprises a touch sensitive screen.

* * * * *

UNITED STATES PATENT AND TRADEMARK OFFICE
CERTIFICATE OF CORRECTION

PATENT NO. : 5,408,250
DATED : April 18, 1995
INVENTOR(S) : Eric A. Bier

It is certified that error appears in the above-indentified patent and that said Letters Patent is hereby corrected as shown below:

On the Title page, in [56] the following Prior Art references should be listed:

| | | | |
|---|---|---|---|
| 3,510,777 | 5/10/67 | Gordon | 340/825.47 |
| 3,976,995 | 8/24/76 | Sebestyen | 340/706X |
| 3,996,581 | 12/7/76 | Brodeur | 400/88X |
| 4,173,016 | 10/30/79 | Dickson | 340/825.47X |
| 4,696,054 | 9/22/87 | Tsugei | 340/825.44/X |
| 4,754,268 | 6/28/88 | Mori | 340/710 |
| 4,774,706 | 9/27/88 | Adams | 370/94 |
| 4,811,420 | 3/7/89 | Avis, et al. | 379/63X |
| 4,837,858 | 6/6/89 | Ablay, et al. | 379/63X |
| 4,856,090 | 8/8/89 | Kitani, et al. | 400/88X |
| 4,890,280 | 12/26/89 | Hirata | 370/60 |
| 4,897,874 | 1/30/90 | Lidinsky | 370/60X |
| 4,901,309 | 2/13/90 | Turner | 370/60 |

UNITED STATES PATENT AND TRADEMARK OFFICE
CERTIFICATE OF CORRECTION

PATENT NO. : 5,408,250

DATED : April 18, 1995

INVENTOR(S) : Eric A. Bier

It is certified that error appears in the above-indentified patent and that said Letters Patent is hereby corrected as shown below:

| | | | |
|---|---|---|---|
| 4,905,231 | 2/27/90 | Leung, et al. | 370/94.1 |
| 4,920,531 | 4/24/90 | Isono, et al. | 370/60 |

Signed and Sealed this

Thirteenth Day of February, 1996

Attest:

BRUCE LEHMAN

Attesting Officer      Commissioner of Patents and Trademarks